US008873160B2

(12) United States Patent
Hara

(10) Patent No.: US 8,873,160 B2
(45) Date of Patent: Oct. 28, 2014

(54) TAKING LENS SYSTEM AND IMAGE PICKUP APPARATUS USING THE SAME

(71) Applicant: Olympus Imaging Corp., Tokyo (JP)

(72) Inventor: Kento Hara, Tokyo (JP)

(73) Assignee: Olympus Imaging Corp., Toyko (JP)

(*) Notice: Subject to any disclaimer, the term of this patent is extended or adjusted under 35 U.S.C. 154(b) by 133 days.

(21) Appl. No.: 13/749,437

(22) Filed: Jan. 24, 2013

(65) Prior Publication Data

US 2013/0188091 A1 Jul. 25, 2013

(30) Foreign Application Priority Data

Jan. 24, 2012 (JP) ................... 2012-012109

(51) Int. Cl.
G02B 15/14 (2006.01)
G02B 15/22 (2006.01)
G02B 15/173 (2006.01)

(52) U.S. Cl.
CPC .............. G02B 15/22 (2013.01); G02B 15/173 (2013.01)
USPC ........................................................ 359/684

(58) Field of Classification Search
USPC ........................................................ 359/684
See application file for complete search history.

(56) References Cited

U.S. PATENT DOCUMENTS

| 4,917,482 A | 4/1990 | Ito |
| 2012/0293879 A1* | 11/2012 | Hayashi et al. ............... 359/786 |

FOREIGN PATENT DOCUMENTS

| JP | 01-298307 | 12/1989 |
| JP | 11-352402 | 12/1999 |

* cited by examiner

Primary Examiner — James Jones
(74) Attorney, Agent, or Firm — Kenyon & Kenyon LLP

(57) ABSTRACT

A taking lens system comprises a frontmost lens unit, a rearmost lens unit, and a plurality of lens units arranged between the frontmost lens unit and the rearmost lens unit. One of the plurality of lens units is a first focusing lens unit. During focusing from an infinite object distance to a close object distance, only the first focusing lens unit moves toward the image side in a first shooting mode, and at least two lens units in the taking lens system move in a second shooting mode. In the state in which the taking lens system is focused on an object at infinity, the positions of the first focusing lens unit and at least one lens unit in the taking lens system in the first shooting mode are different from those in the second shooting mode. The taking lens system satisfies the condition $M_{n1} > M_{n2}$.

17 Claims, 31 Drawing Sheets

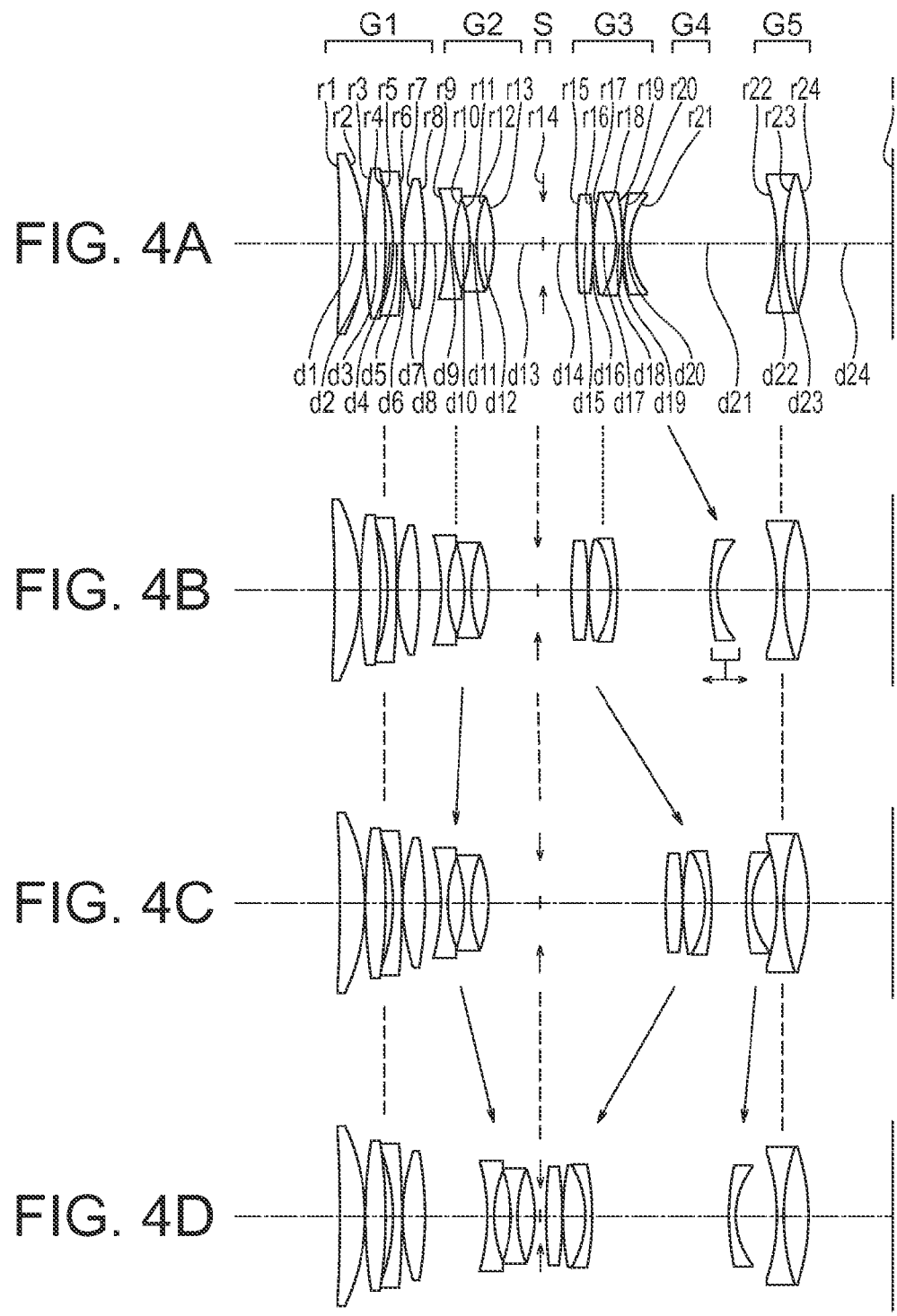

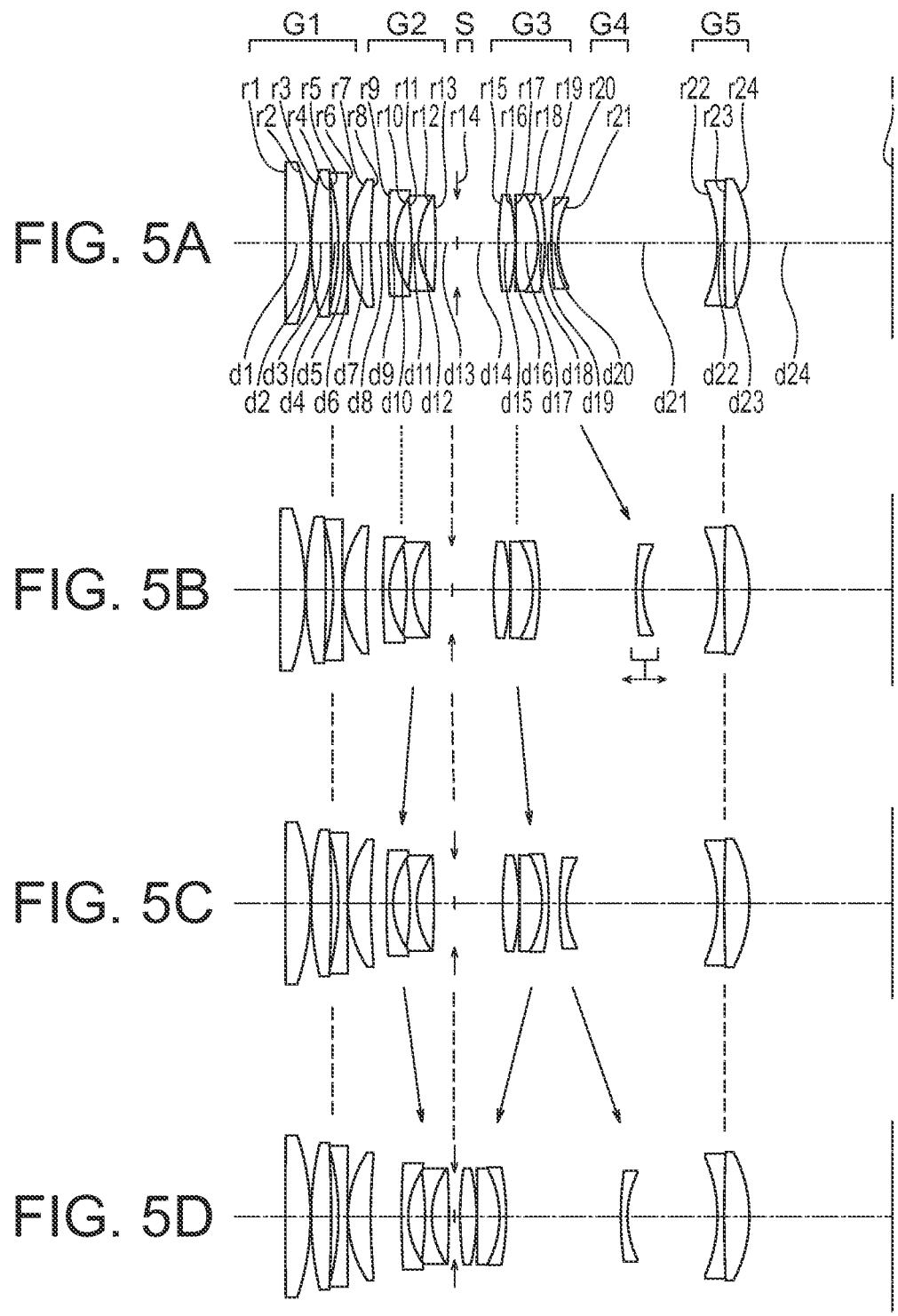

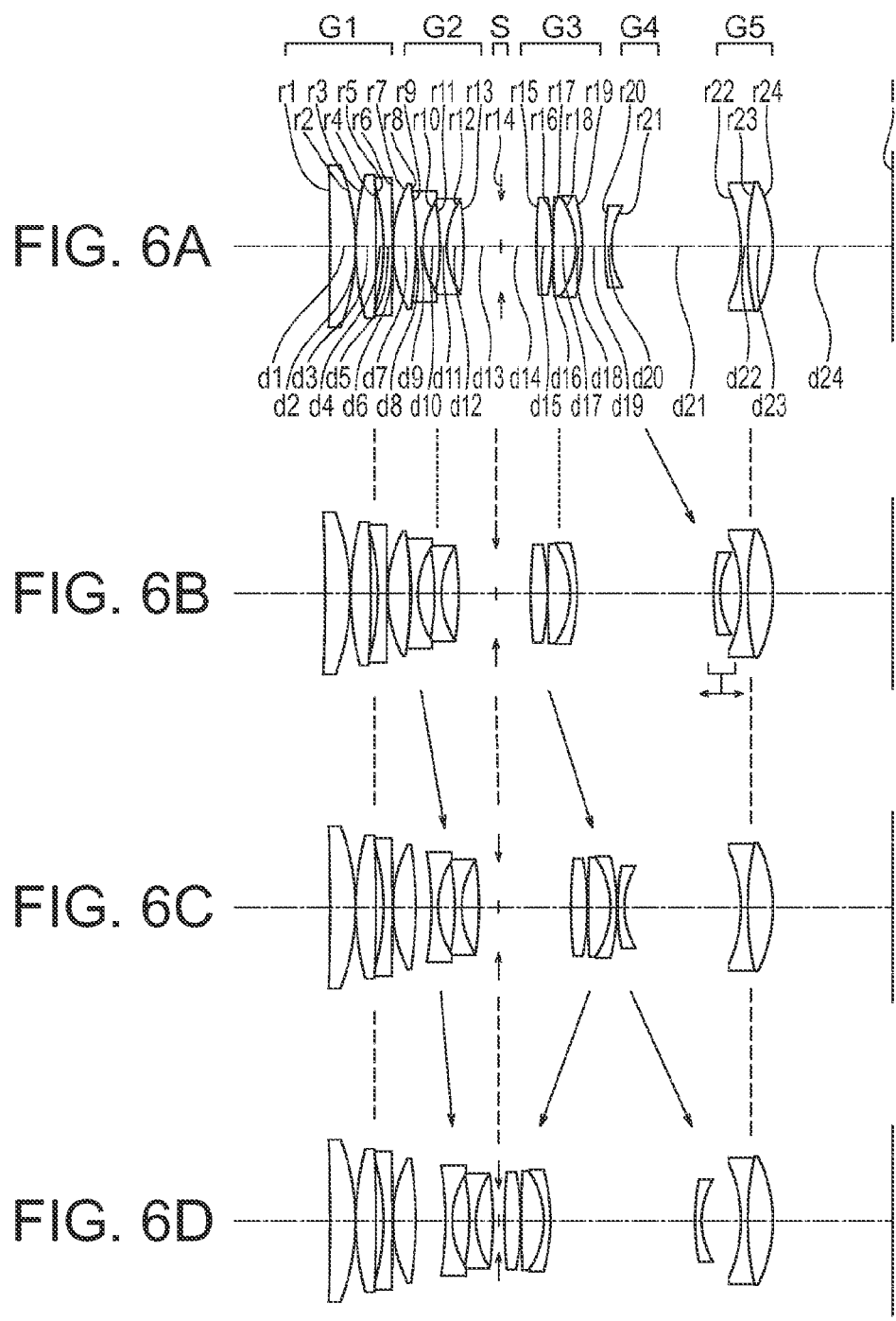

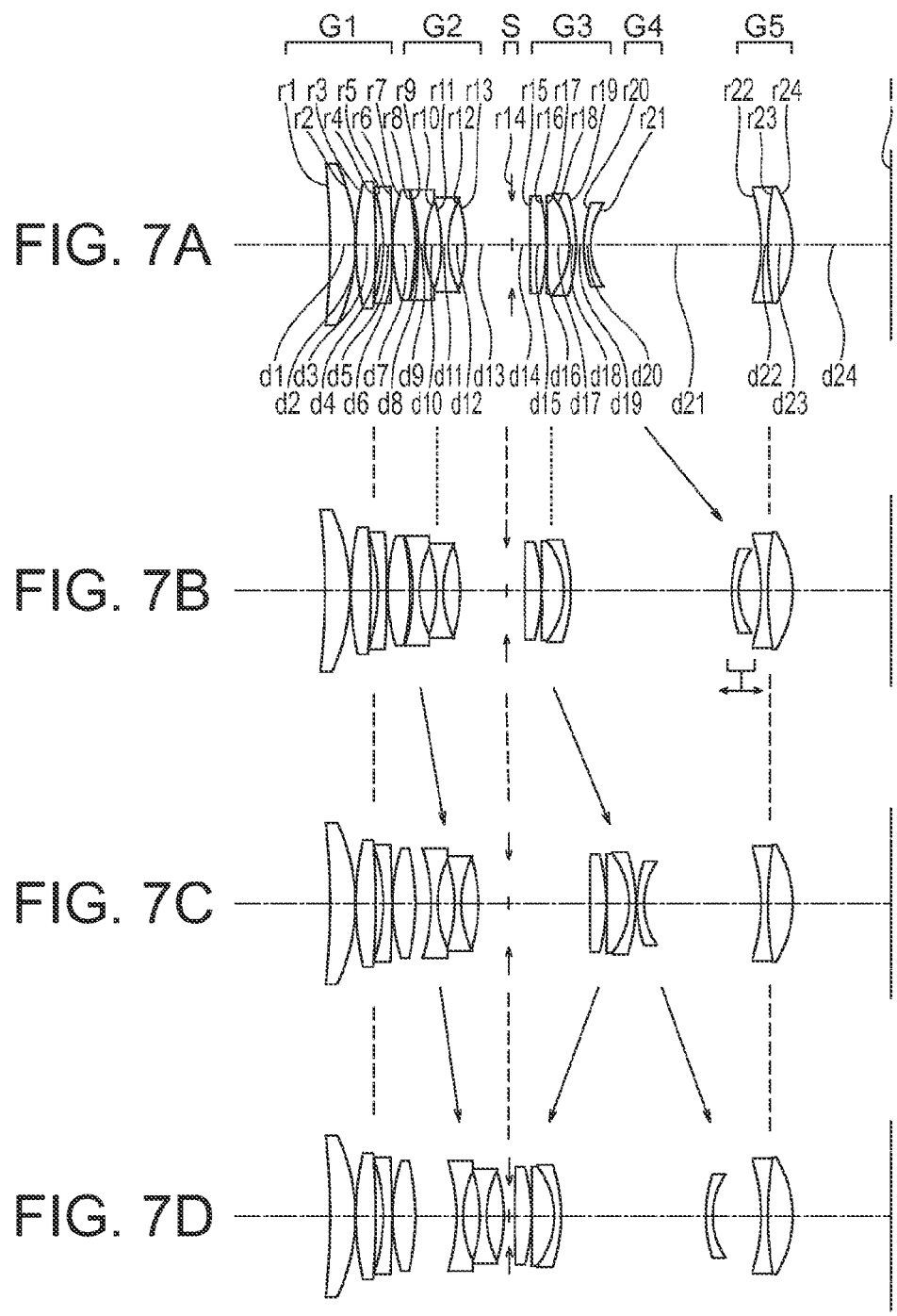

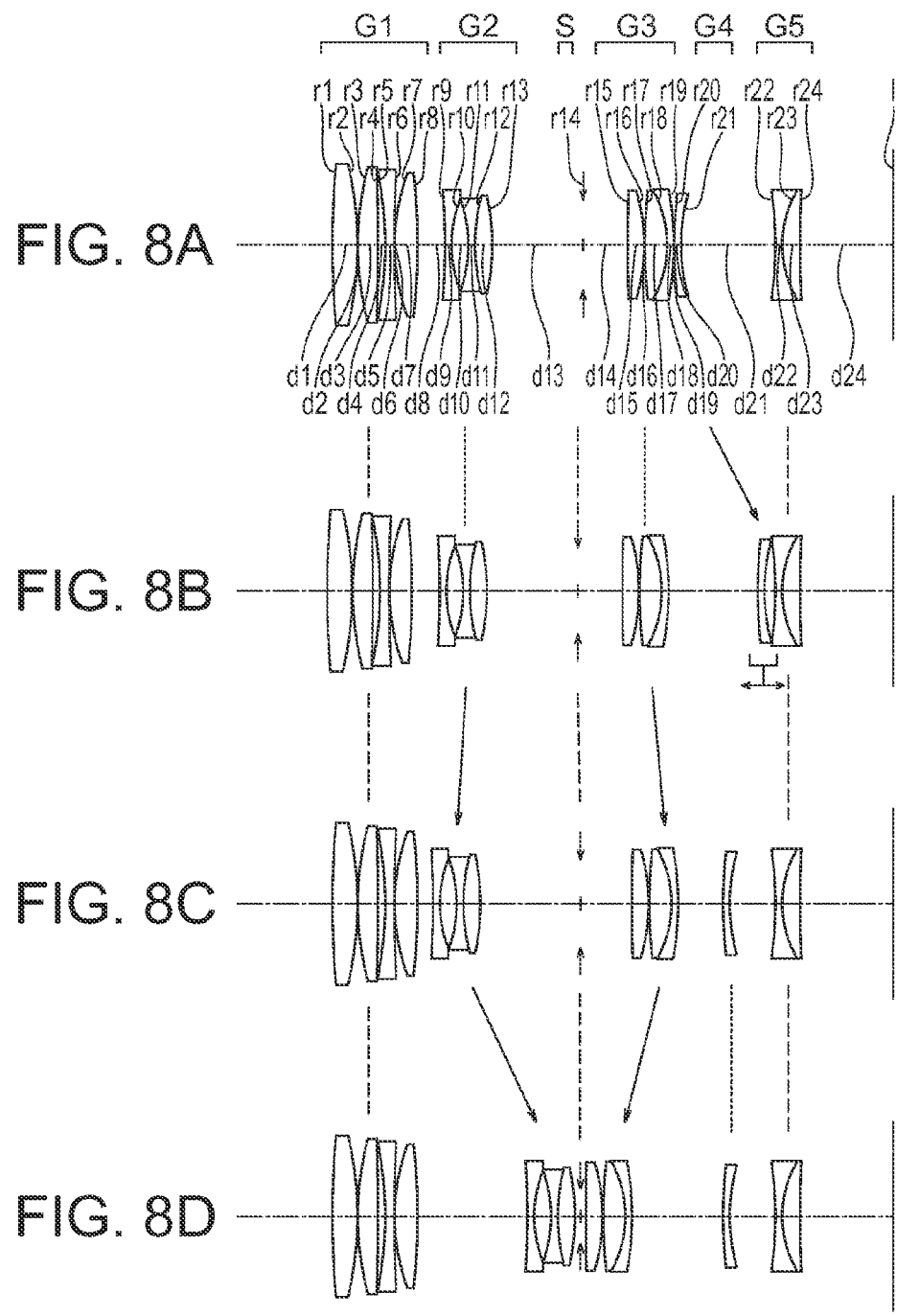

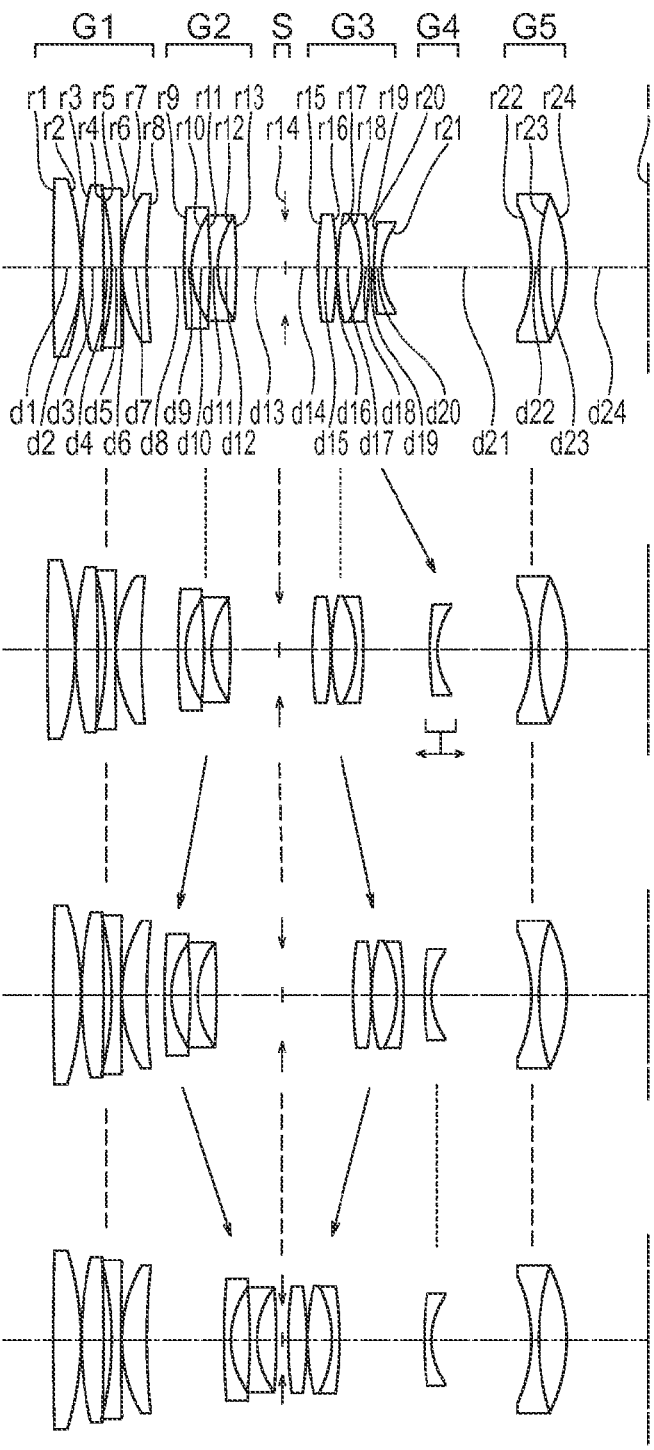

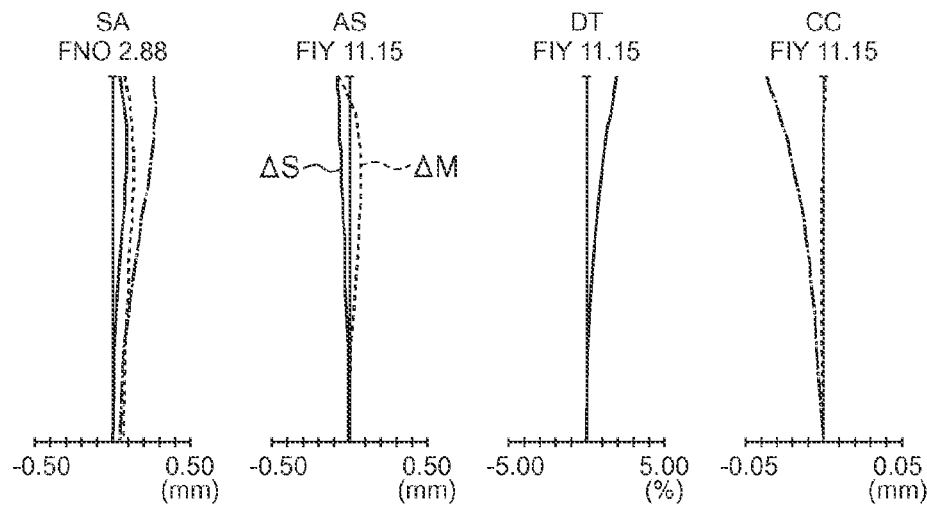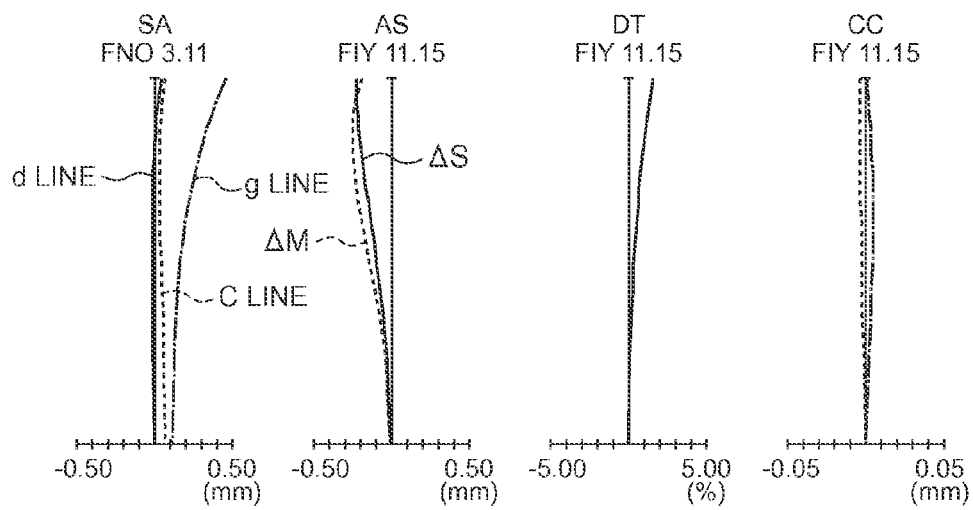

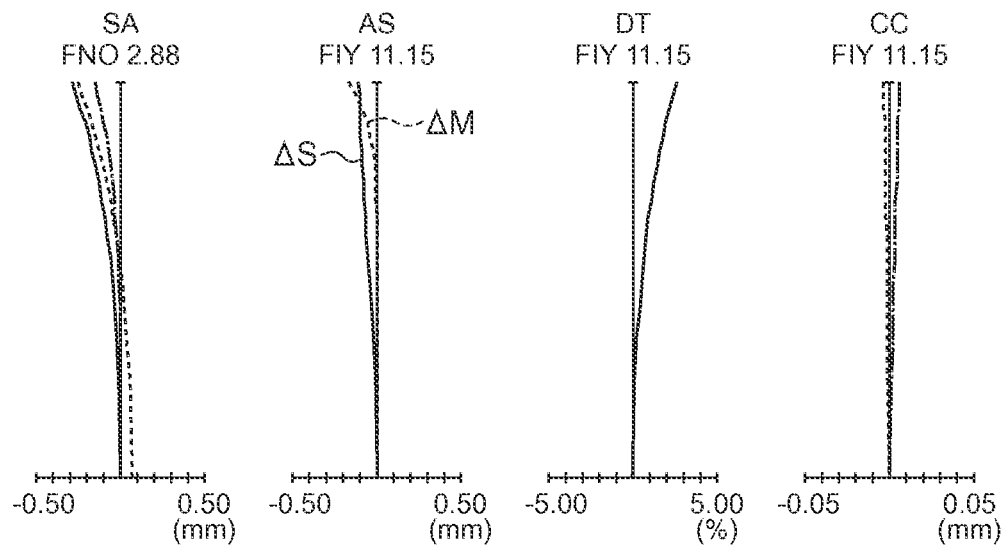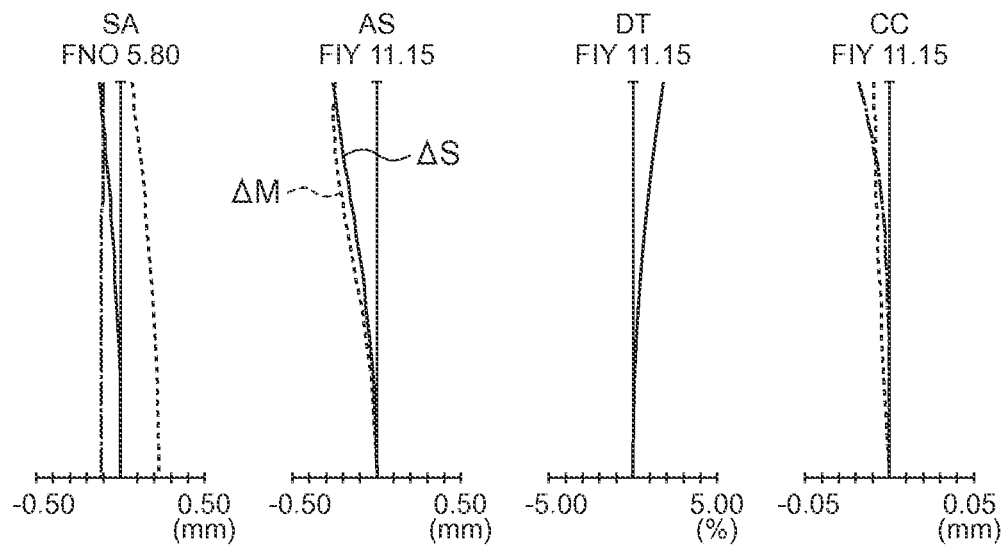

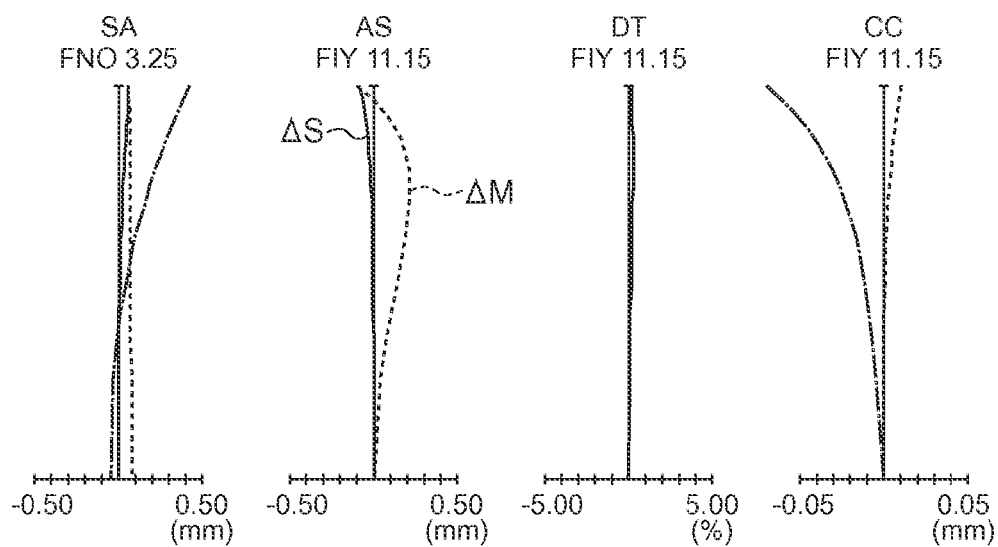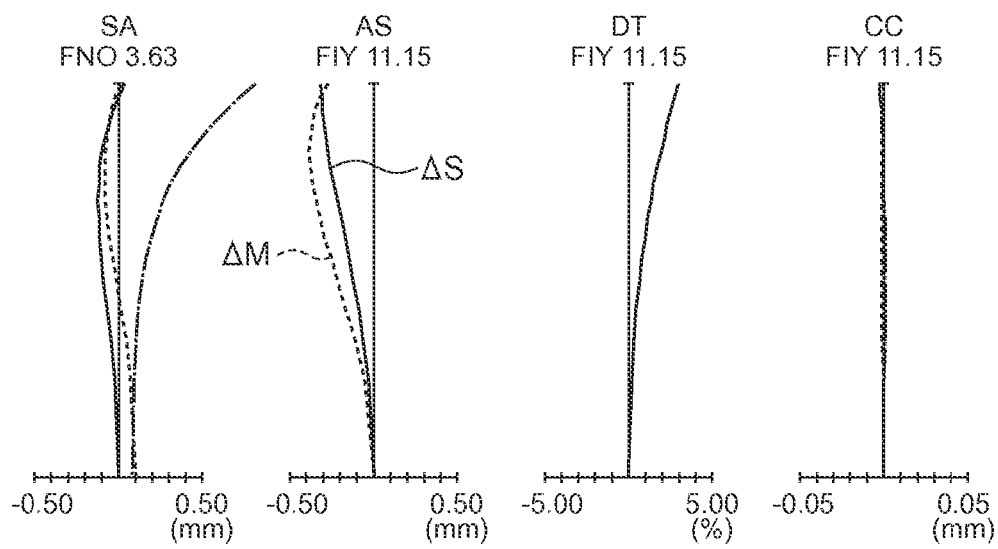

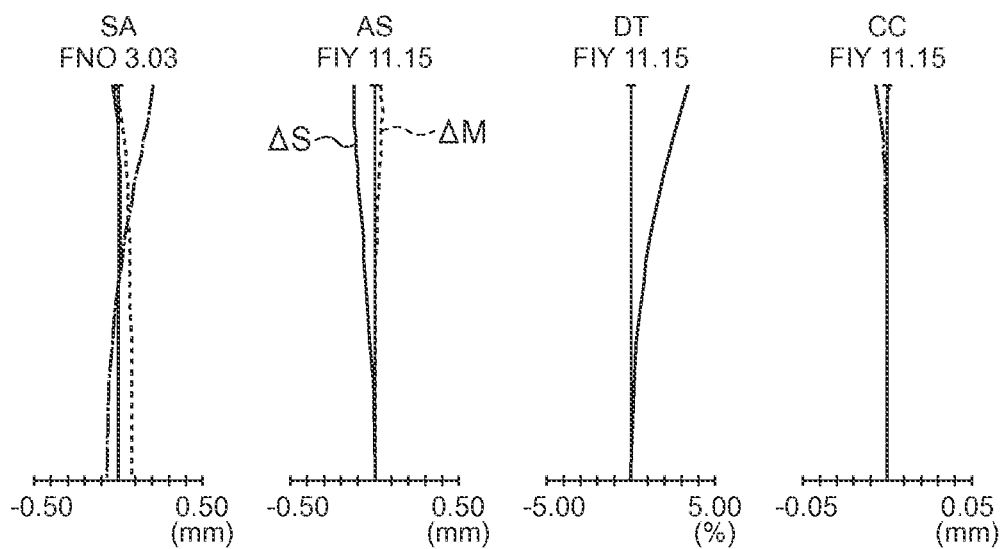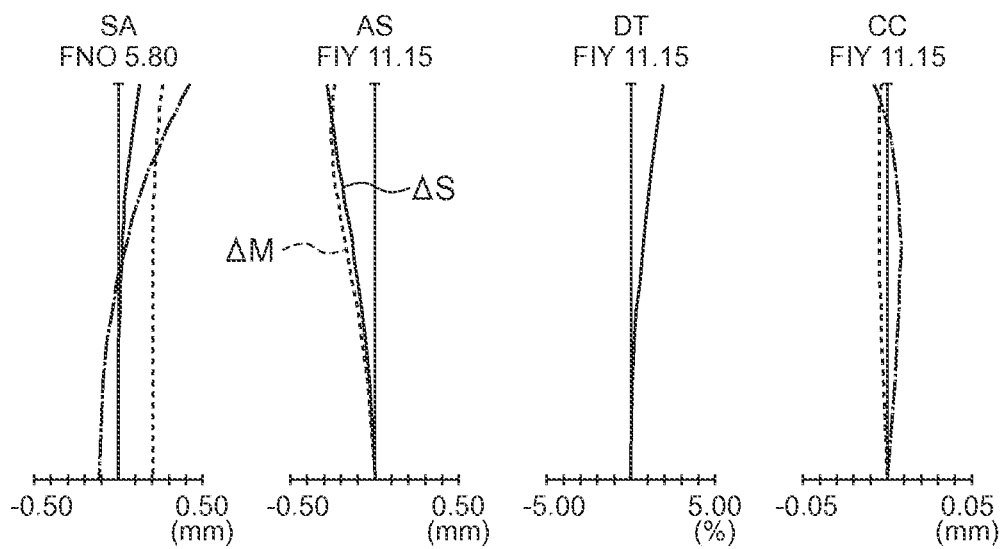

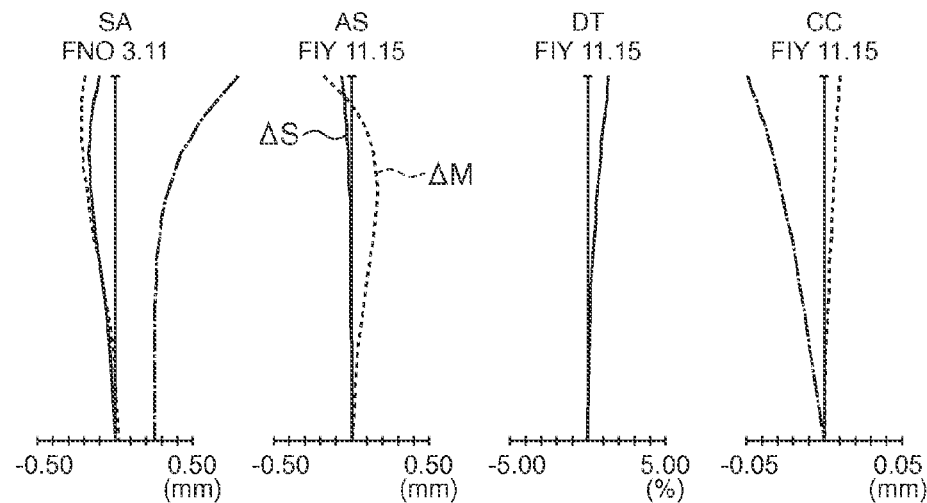
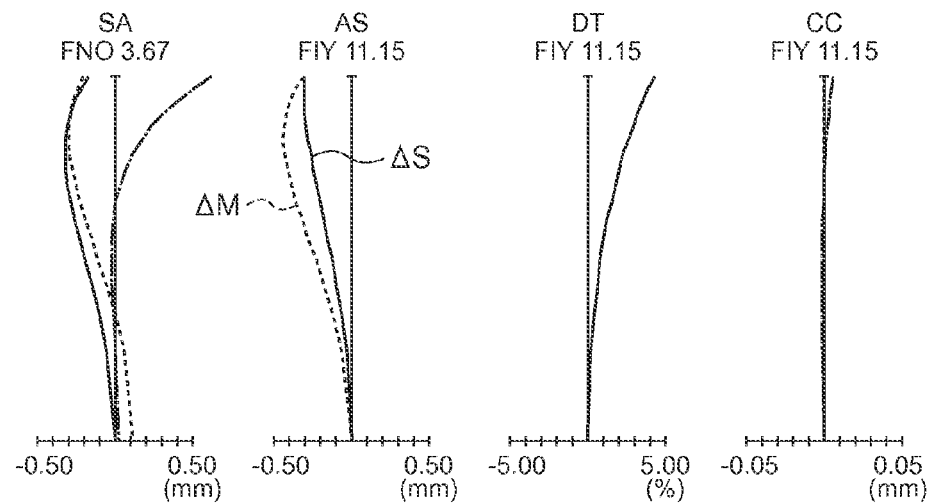

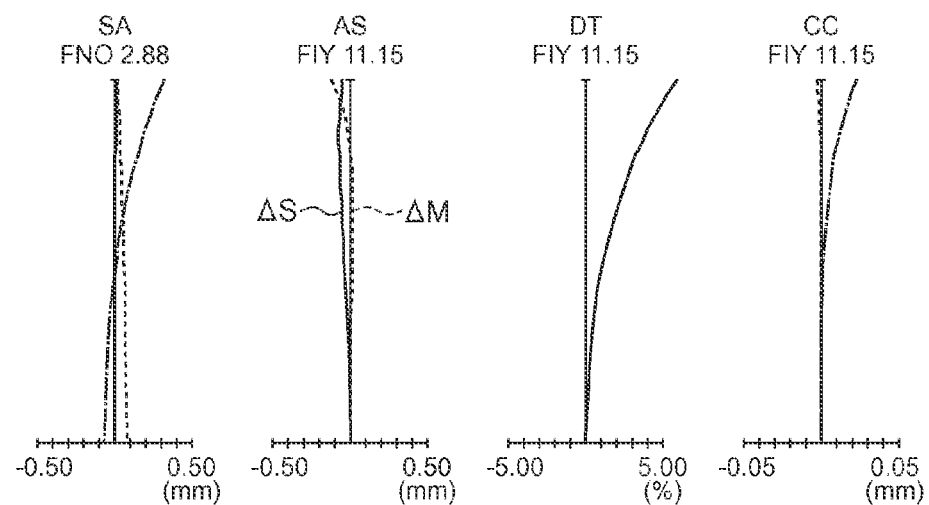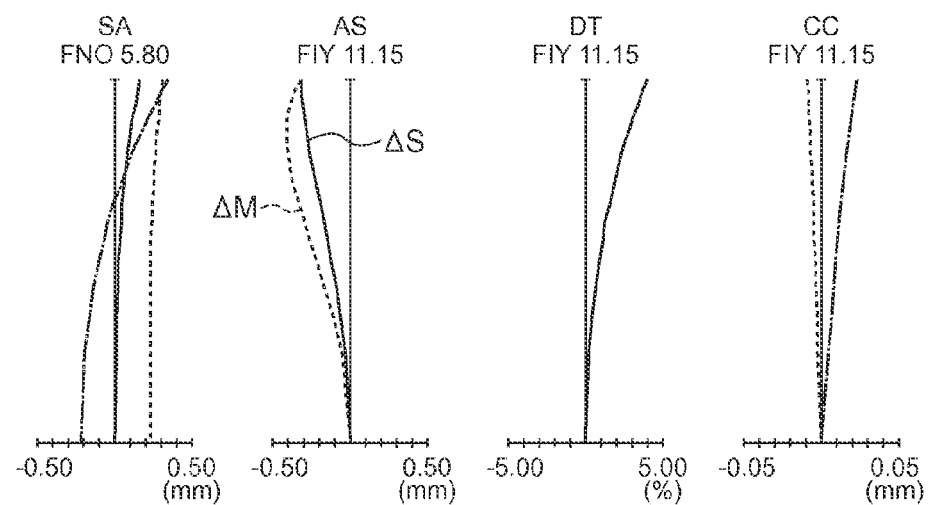

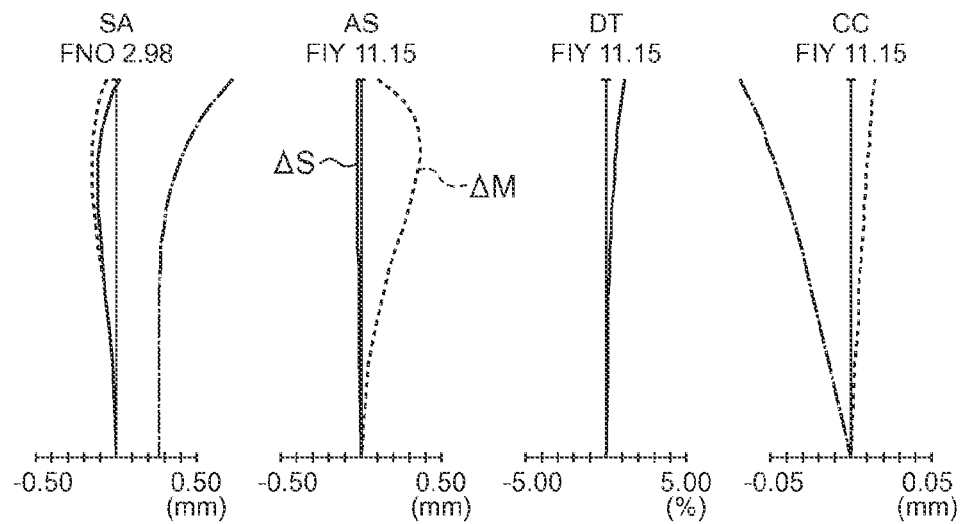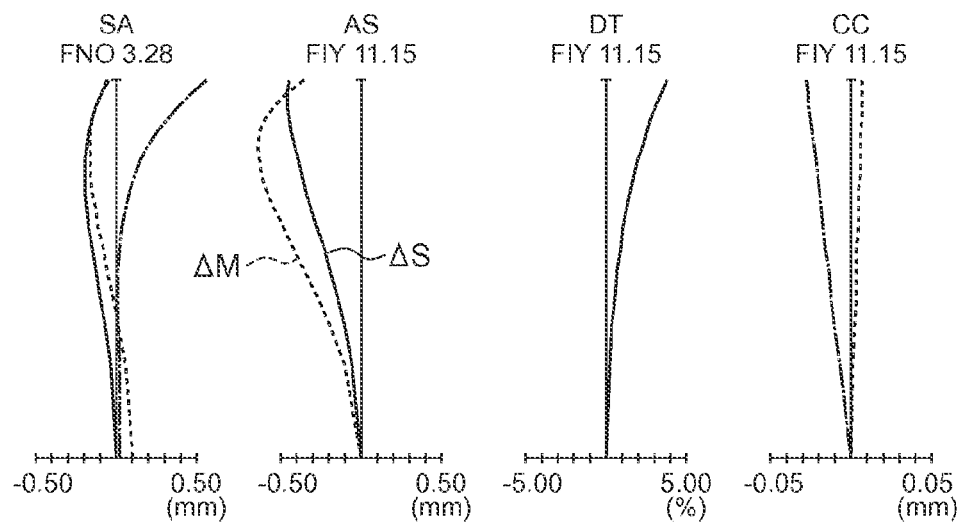

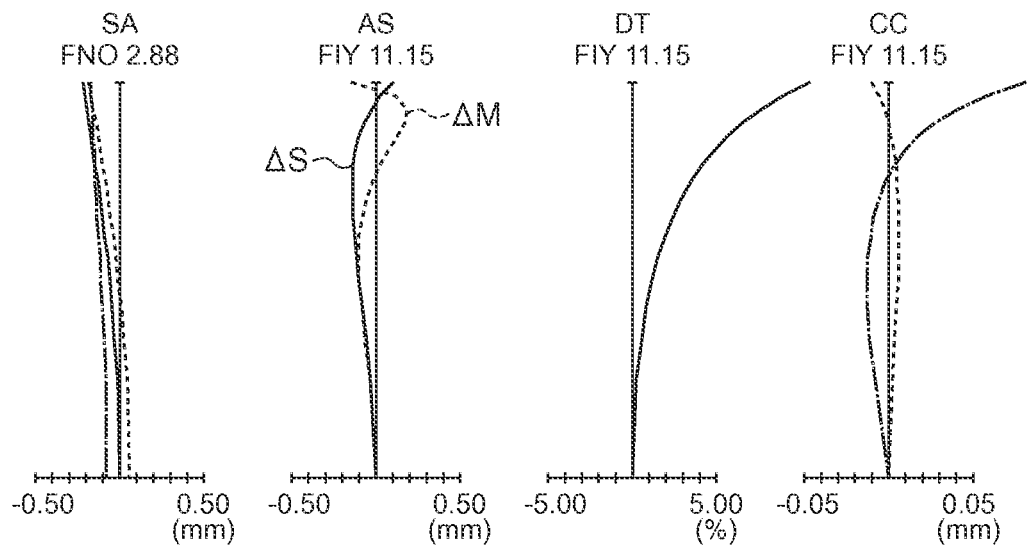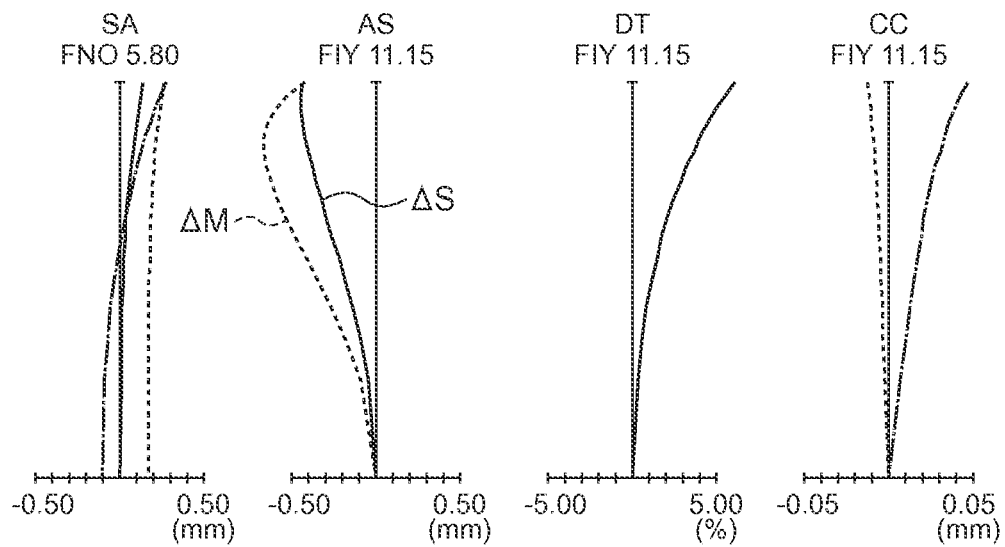

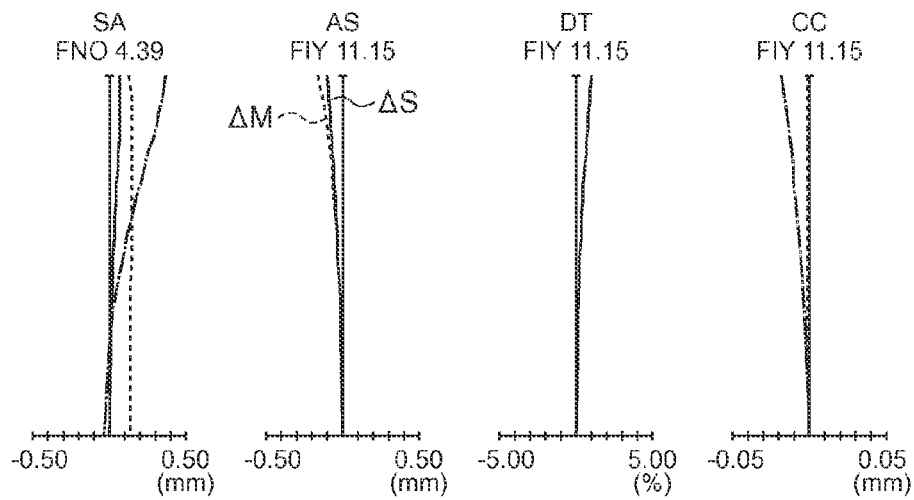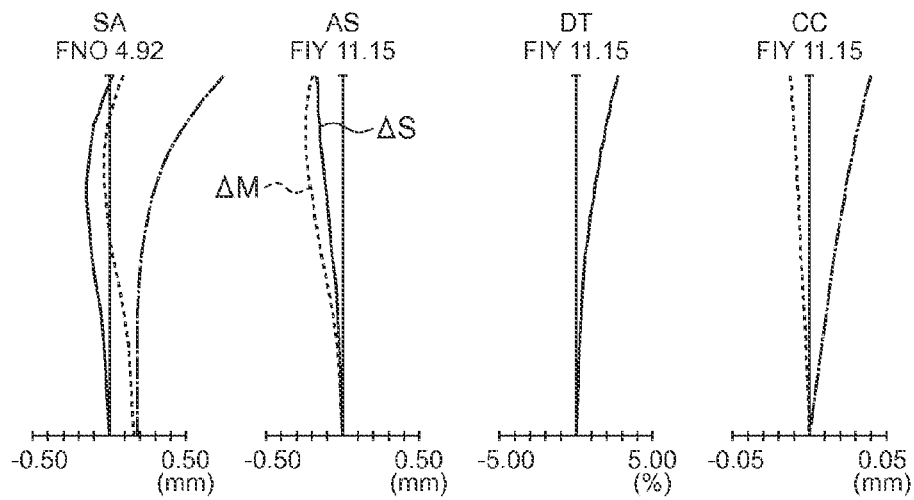

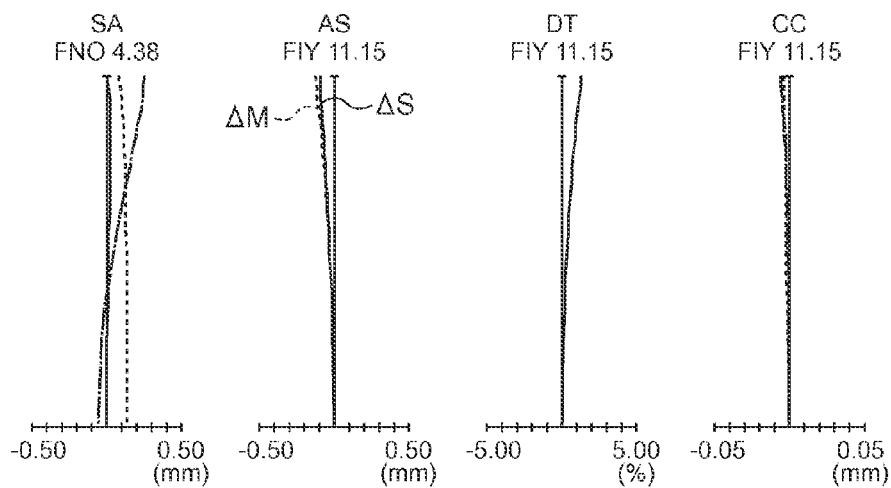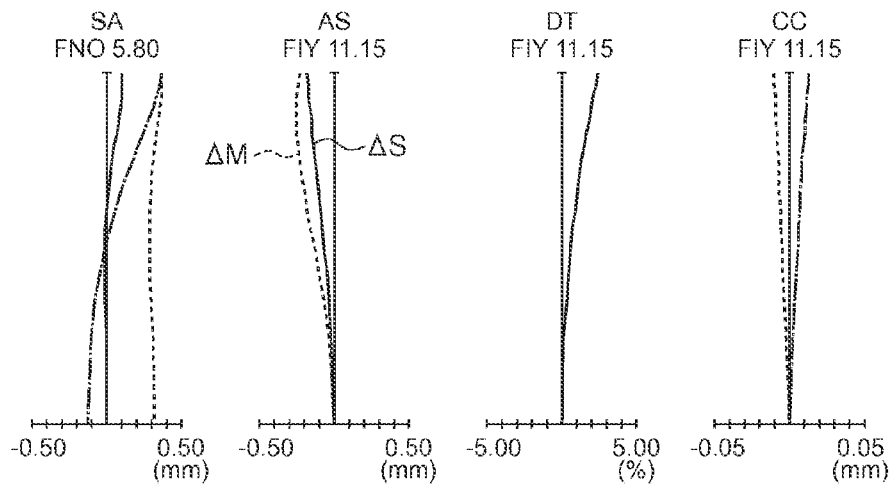

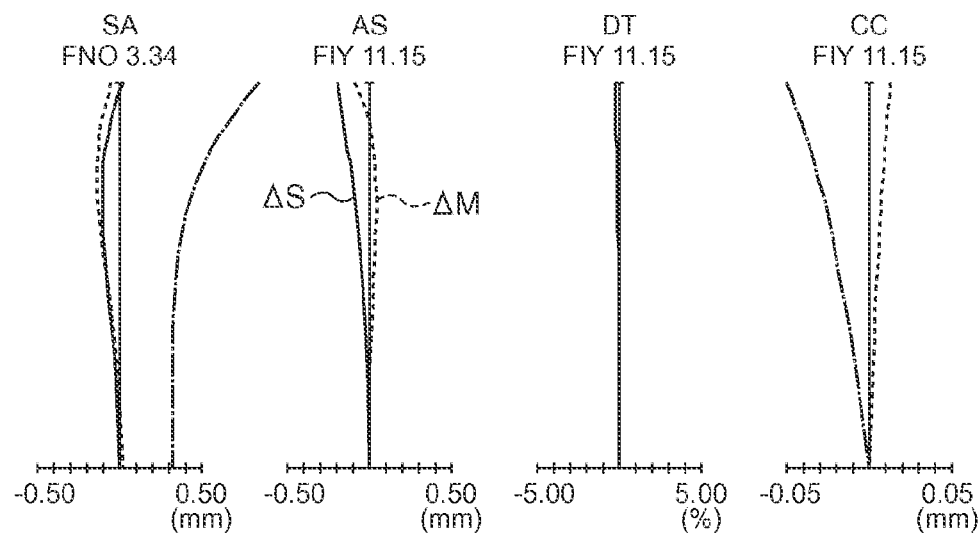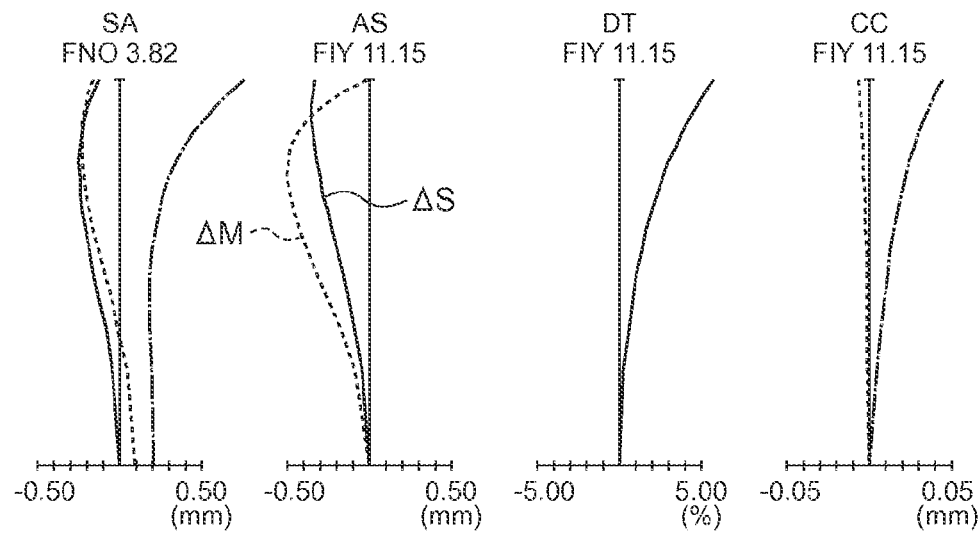

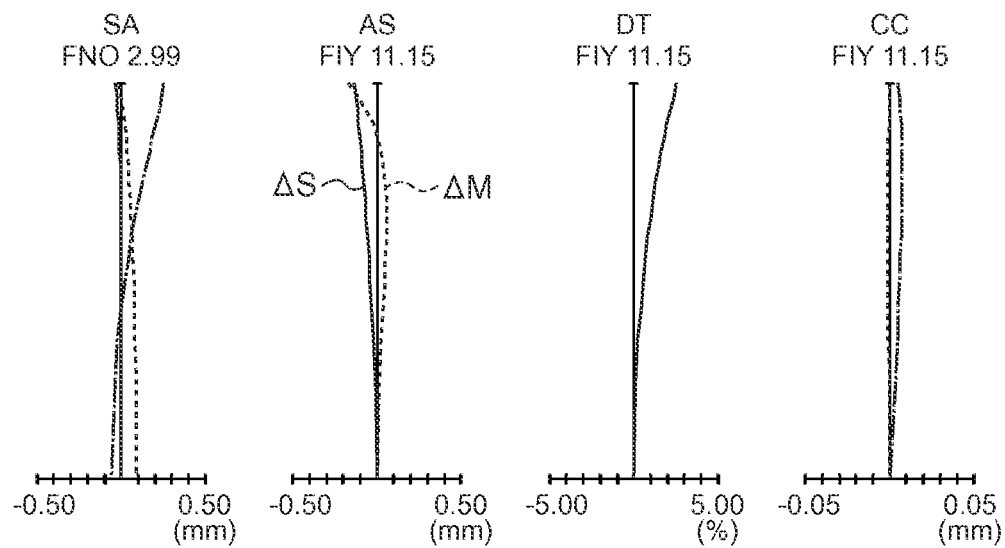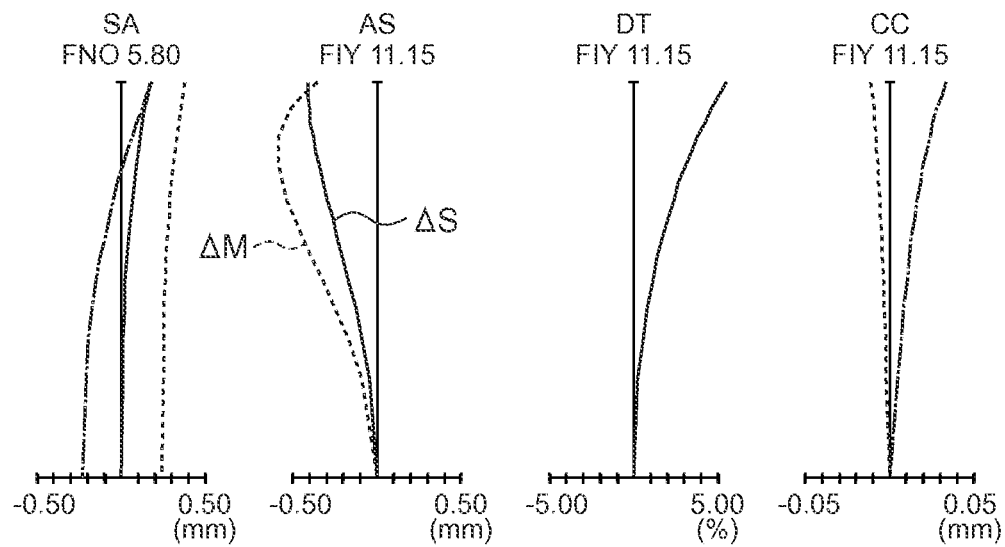

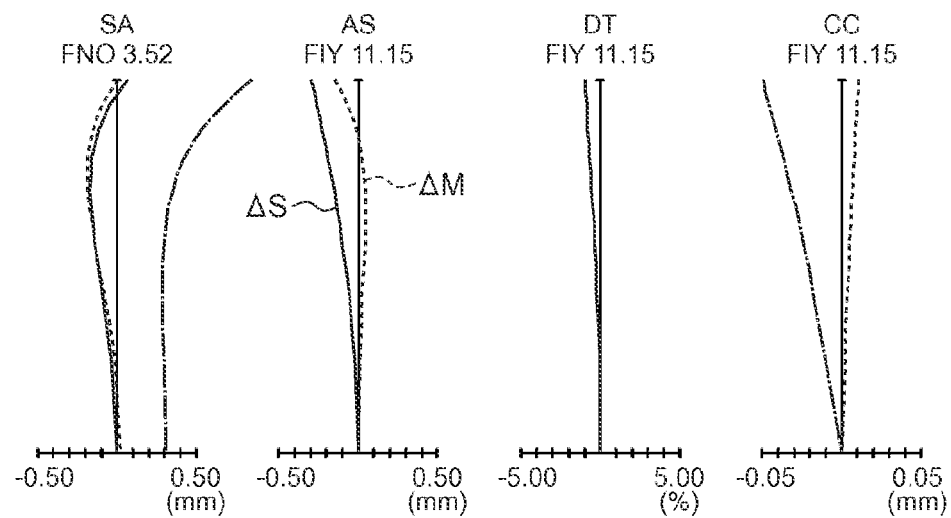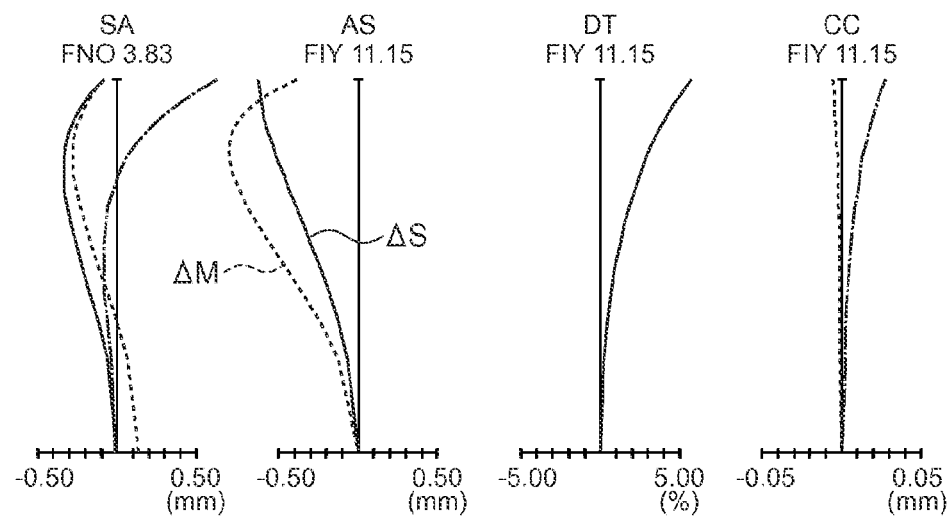

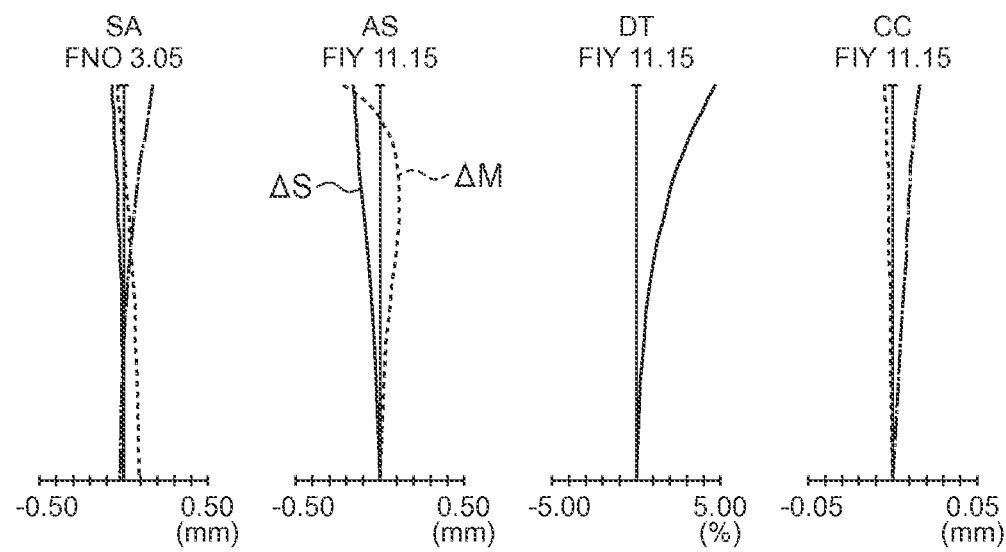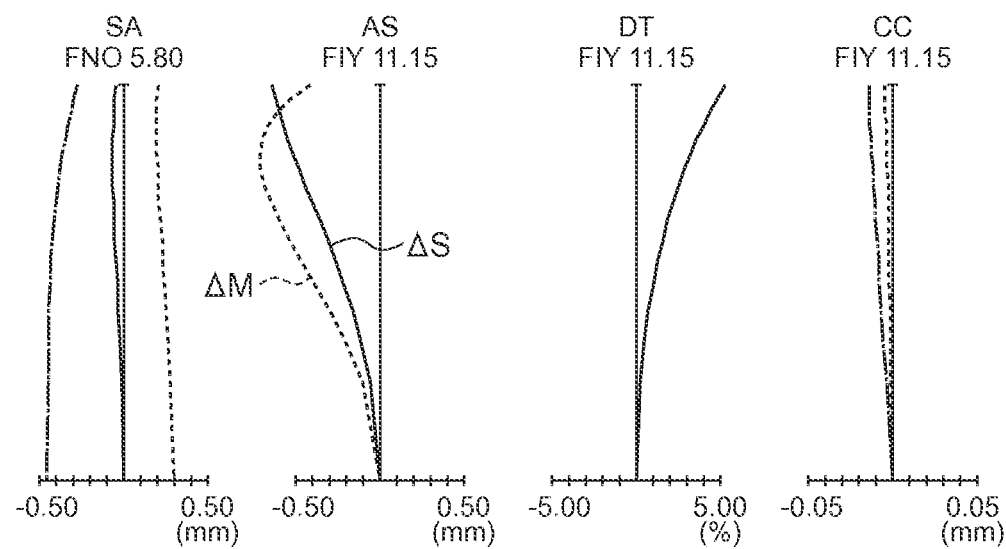

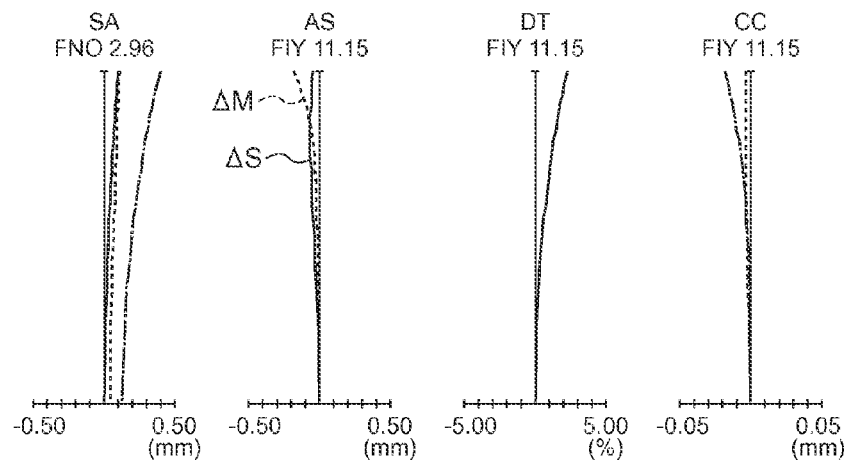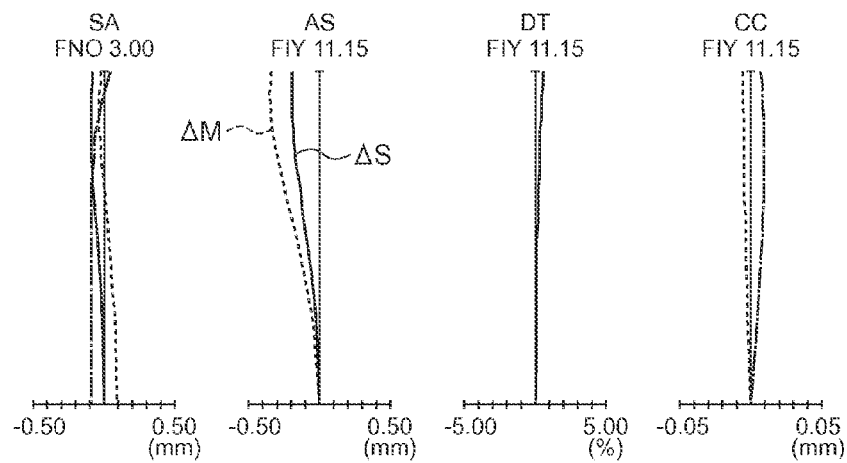

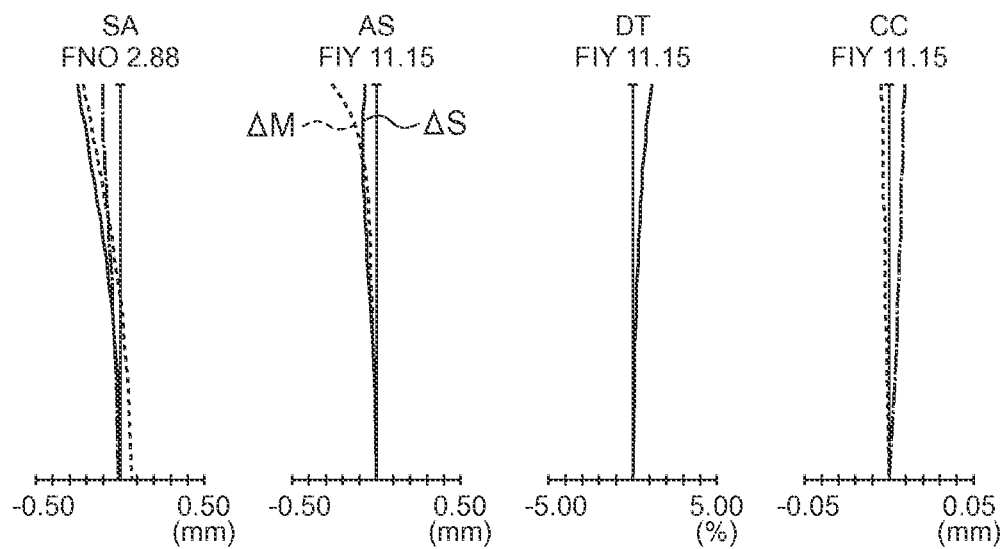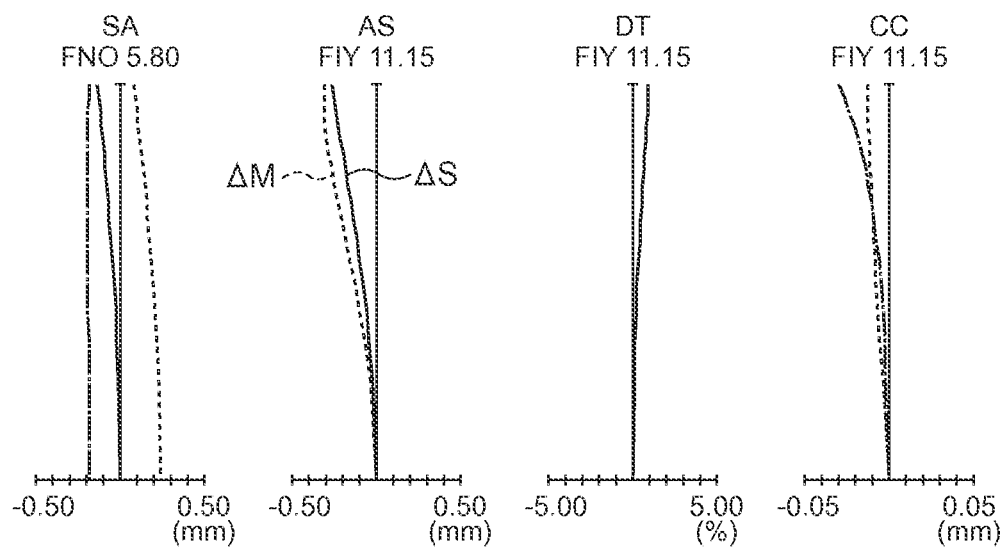

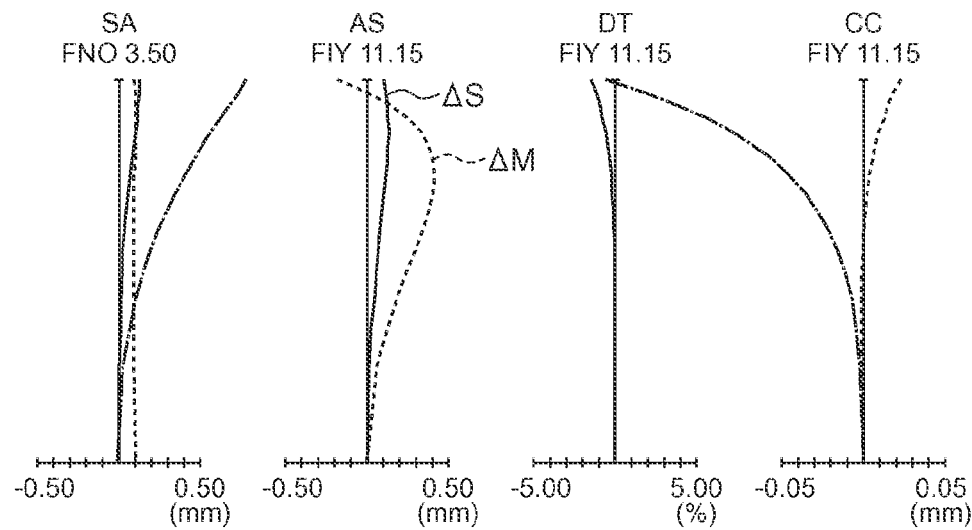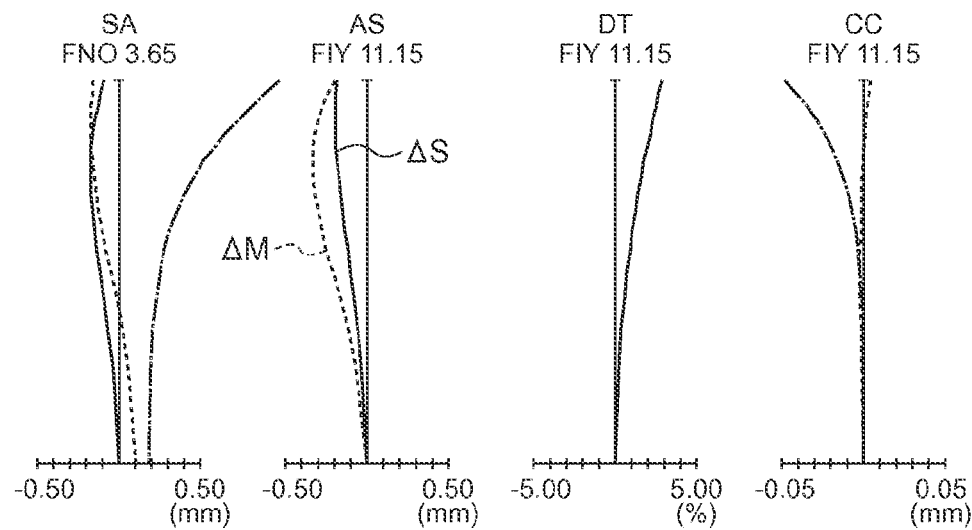

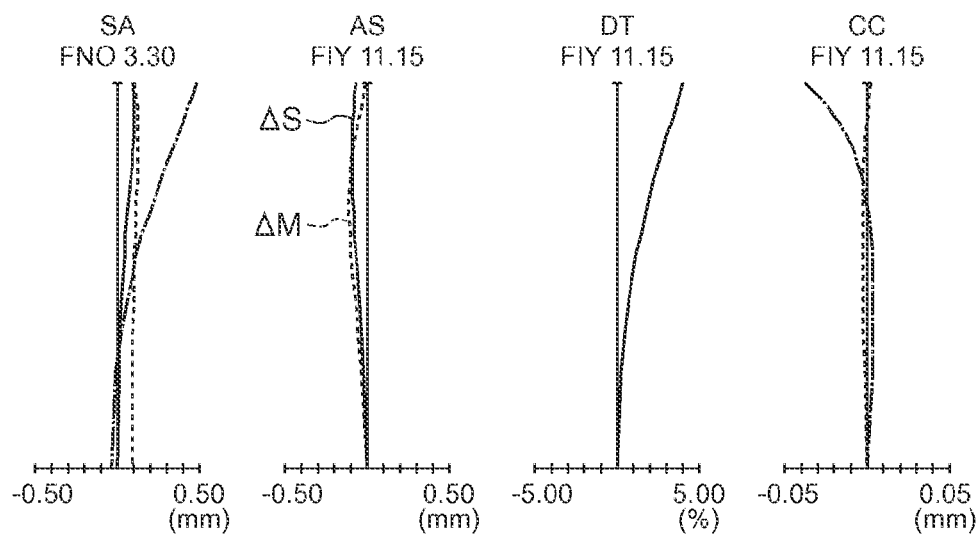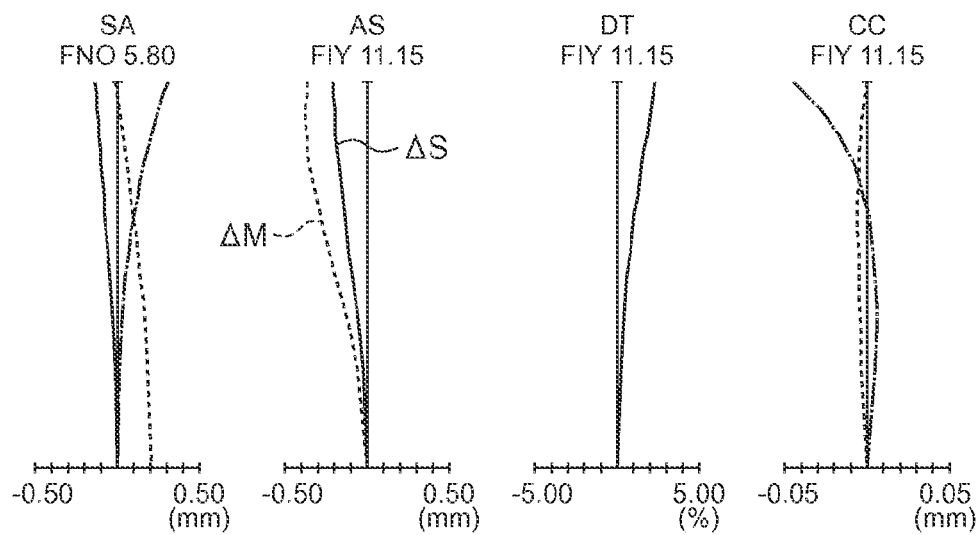

TAKING LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2012-012109 filed on Jan. 24, 2012; the entire contents of which are incorporated herein by reference.

BACKGROUND OF THE INVENTION

1. Field of the Invention

The present invention relates to a taking lens system and an image pickup apparatus using the same.

2. Description of the Related Art

There have been known taking lens systems in which a plurality of lens units are moved for focusing onto an object at a very close distance. In such taking lens systems, the shooting distance to a very close object is reduced by moving a plurality of lens units. In this context, a very close object (or an object at a very close distance) refers to an object that is located at a position closer to the image pickup apparatus than the positions of close objects in the normal focusing range.

For instance, Japanese Patent Application Laid-Open No. 1-298307 discloses a taking lens system in which normal focusing operation is performed by moving the first lens unit having a positive refractive power toward the object side. In the taking lens system disclosed in Japanese Patent Application Laid-Open No. 1-298307, to effect focusing on a very close object, a lens unit arranged subsequent to the first lens unit is moved.

Japanese Patent Application Laid-Open No. 11-352402 discloses a taking lens system in which normal focusing operation at the telephoto end of the zoom range is performed by moving the third lens unit having a positive refractive power toward the image side. In the taking lens system disclosed in Japanese Patent Application Laid-Open No. 11-352402, to effect focusing on a very close object, the first lens unit and the second lens unit are moved.

SUMMARY OF THE INVENTION

A taking lens system according to the present invention comprises:

a frontmost lens unit that is arranged closest to the object side;

a rearmost lens unit that is arranged closest to the image side; and a plurality of lens units that are arranged between the frontmost lens unit and the rearmost lens unit, wherein one of the plurality of lens units is a first focusing lens unit;

in a first shooting mode, only the first focusing lens unit moves toward the image side during focusing from an infinite object distance to a close object distance;

in a second shooting mode, at least two lens units in the taking lens system move during focusing from an infinite object distance to a close object distance;

in the state in which the taking lens system is focused on an object at infinity, the positions of the first focusing lens unit and at least one lens unit in the taking lens system in the first shooting mode are different from those in the second shooting mode, and $M_{n1} > M_{n2}$ is satisfied, where $M_{n1}$ is the distance between the first focusing lens unit and the image plane in the first shooting mode, and $M_{n2}$ is the distance between the first focusing lens unit and the image plane in the second shooting mode, both in the state in which the taking lens system is focused on an object at infinity.

An image pickup apparatus according to the present invention comprises:

a taking lens system; and an image pickup element that is disposed on the image side of the taking lens system and converts an image formed by the taking lens system into an electrical signal.

BRIEF DESCRIPTION OF THE DRAWINGS

FIG. 1A is a cross sectional view of the lens system in the state in which it is focused on an object at infinity in the first shooting mode, FIG. 1B is a cross sectional view of the lens system in the state in which it is focused on an object at a close distance in the first shooting mode, FIG. 1C is a cross sectional view of the lens system in the state in which it is focused on an object at infinity in the second shooting mode, FIG. 1D is a cross sectional view of the lens system in the state in which it is focused on an object at a close distance in the second shooting mode;

FIGS. 4A, 4B, 4C, and 4D are cross sectional views of a taking lens system according to a fourth example of the present invention, similar to FIGS. 1A, 1B, 1C, and 1D;

FIGS. 5A, 5B, 5C, and 5D are cross sectional views of a taking lens system according to a fifth example of the present invention, similar to FIGS. 1A, 1B, 1C, and 1D;

FIGS. 6A, 6B, 6C, and 6D are cross sectional views of a taking lens system according to a sixth example of the present invention, similar to FIGS. 1A, 1B, 1C, and 1D;

FIGS. 7A, 7B, 7C, and 7D are cross sectional views of a taking lens system according to a seventh example of the present invention, similar to FIGS. 1A, 1B, 1C, and 1D;

FIGS. 8A, 8B, 8C, and 8D are cross sectional views of a taking lens system according to a eighth example of the present invention, similar to FIGS. 1A, 1B, 1C, and 1D;

FIGS. 9A, 9B, 9C, and 9D are cross sectional views of a taking lens system according to a ninth example of the present invention, similar to FIGS. 1A, 1B, 1C, and 1D;

FIGS. 10A, 10B, 10C, 10D, 10E, 10F, 10G, and 10H are aberration diagrams of the taking lens system according to the first example in the state in which the lens system is focused on an object at infinity and in the state in which the lens system is focused on an object at close distance in the first shooting mode;

FIGS. 11A, 11B, 11C, 11D, 11E, 11F, 11G, and 11H are aberration diagrams of the taking lens system according to the first example in the state in which the lens system is focused on an object at infinity and in the state in which the lens system is focused on an object at close distance in the second shooting mode;

FIGS. 12A, 12B, 12C, 12D, 12E, 12F, 12G, and 12H are aberration diagrams of the taking lens system according to the second example, similar to FIGS. 10A, 10B, 10C, 10D, 10E, 10F, 10G, and 10H;

FIGS. 13A, 13B, 13C, 13D, 13E, 13F, 13G, and 13H are aberration diagrams of the taking lens system according to the second example, similar to FIGS. 11A, 11B, 11C, 11D, 11E, 11F, 11G, and 11H;

FIGS. 14A, 14B, 14C, 14D, 14E, 14F, 14G, and 14H are aberration diagrams of the taking lens system according to the third example, similar to FIGS. 10A, 10B, 10C, 10D, 10E, 10F, 10G, and 10H;

FIGS. 15A, 15B, 15C, 15D, 15E, 15F, 15G, and 15H are aberration diagrams of the taking lens system according to the third example, similar to FIGS. 11A, 11B, 11C, 11D, 11E, 11F, 11G, and 11H;

FIGS. 16A, 16B, 16C, 16D, 16E, 16F, 16G, and 16H are aberration diagrams of the taking lens system according to the fourth example, similar to FIGS. 10A, 10B, 10C, 10D, 10E, 10F, 10G, and 10H;

FIGS. 17A, 17B, 17C, 17D, 17E, 17F, 17G, and 17H are aberration diagrams of the taking lens system according to the fourth example, similar to FIGS. 11A, 11B, 11C, 11D, 11E, 11F, 11G, and 11H;

FIGS. 18A, 18B, 18C, 18D, 18E, 18F, 18G, and 18H are aberration diagrams of the taking lens system according to the fifth example, similar to FIGS. 10A, 10B, 10C, 10D, 10E, 10F, 10G, and 10H;

FIGS. 19A, 19B, 19C, 19D, 19E, 19F, 19G, and 19H are aberration diagrams of the taking lens system according to the fifth example, similar to FIGS. 11A, 11B, 11C, 11D, 11E, 11F, 11G, and 11H;

FIGS. 20A, 20B, 20C, 20D, 20E, 20F, 20G, and 20H are aberration diagrams of the taking lens system according to the sixth example, similar to FIGS. 10A, 10B, 10C, 10D, 10E, 10F, 10G, and 10H;

FIGS. 21A, 21B, 21C, 21D, 21E, 21F, 21G, and 21H are aberration diagrams of the taking lens system according to the sixth example, similar to FIGS. 11A, 11B, 11C, 11D, 11E, 11F, 11G, and 11H;

FIGS. 22A, 22B, 22C, 22D, 22E, 22F, 22G, and 22H are aberration diagrams of the taking lens system according to the seventh example, similar to FIGS. 10A, 10B, 10C, 10D, 10E, 10F, 10G, and 10H;

FIGS. 23A, 23B, 23C, 23D, 23E, 23F, 23G, and 23H are aberration diagrams of the taking lens system according to the seventh example, similar to FIGS. 11A, 11B, 11C, 11D, 11E, 11F, 11G, and 11H;

FIGS. 24A, 24B, 24C, 24D, 24E, 24F, 24G, and 24H are aberration diagrams of the taking lens system according to the eighth example, similar to FIGS. 10A, 10B, 10C, 10D, 10E, 10F, 10G, and 10H;

FIGS. 25A, 25B, 25C, 25D, 25E, 25F, 25G, and 25H are aberration diagrams of the taking lens system according to the eighth example, similar to FIGS. 11A, 11B, 11C, 11D, 11E, 11F, 11G, and 11H;

FIGS. 26A, 26B, 26C, 26D, 26E, 26F, 26G, and 26H are aberration diagrams of the taking lens system according to the ninth example, similar to FIGS. 10A, 10B, 10C, 10D, 10E, 10F, 10G, and 10H;

FIGS. 27A, 27B, 27C, 27D, 27E, 27F, 27G, and 27H are aberration diagrams of the taking lens system according to the ninth example, similar to FIGS. 11A, 11B, 11C, 11D, 11E, 11F, 11G, and 11H;

DETAILED DESCRIPTION OF THE INVENTION

Figure 1A:
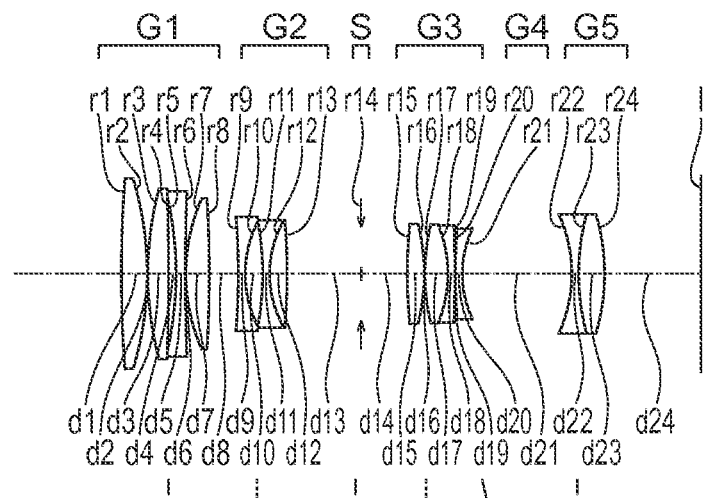
FIGS. 1A, 1B, 1C, and 1D are cross sectional views of a taking lens system according to a first example of the present invention, where
Figure 1B:
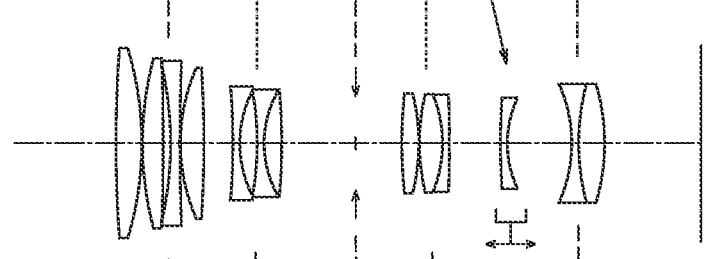
Figure 1C:
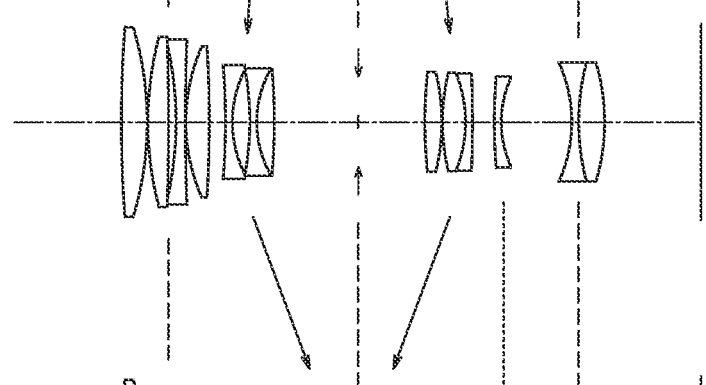
Figure 1D:
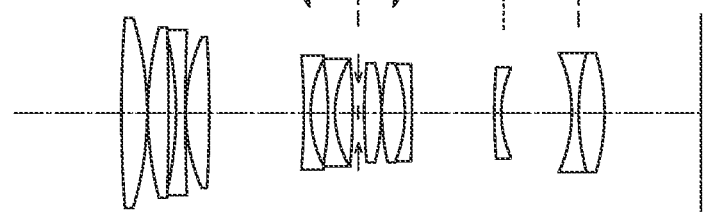
Figure 2A:
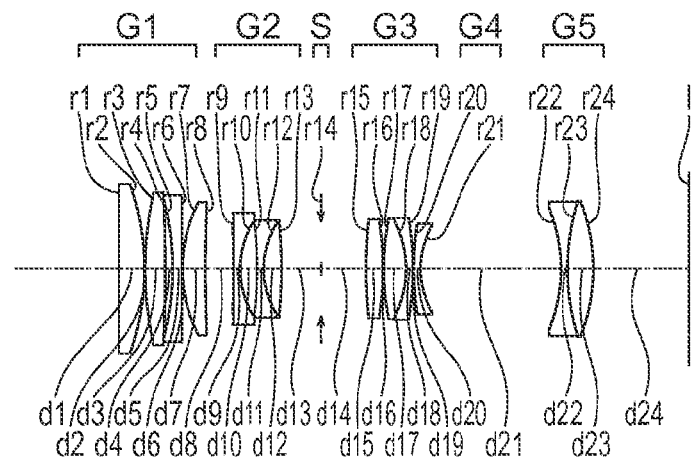
FIGS. 2A, 2B, 2C, and 2D are cross sectional views, similar to FIGS. 1A, 1B, 1C, and 1D, of a taking lens system according to a second example of the present invention.
Figure 2B:
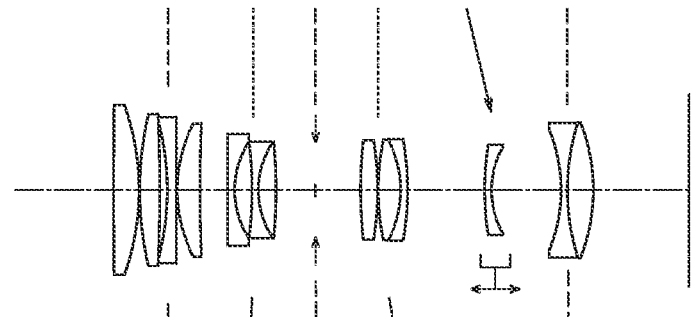
Figure 2C:
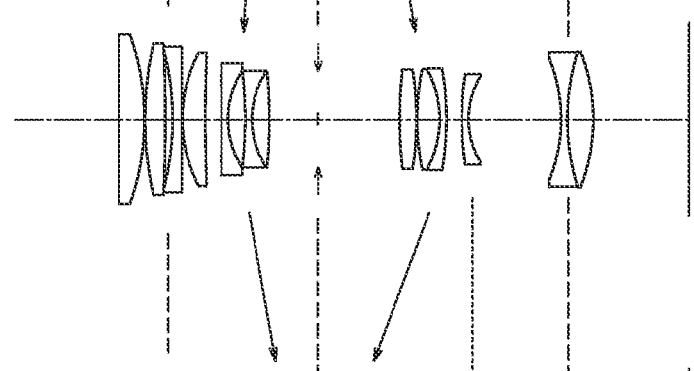
Figure 2D:
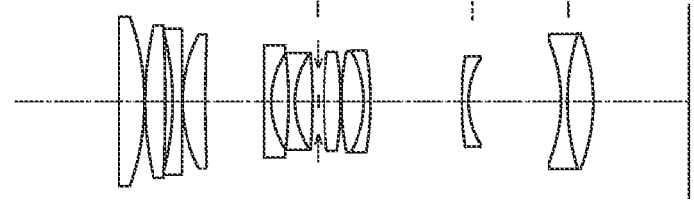
Figure 3A:
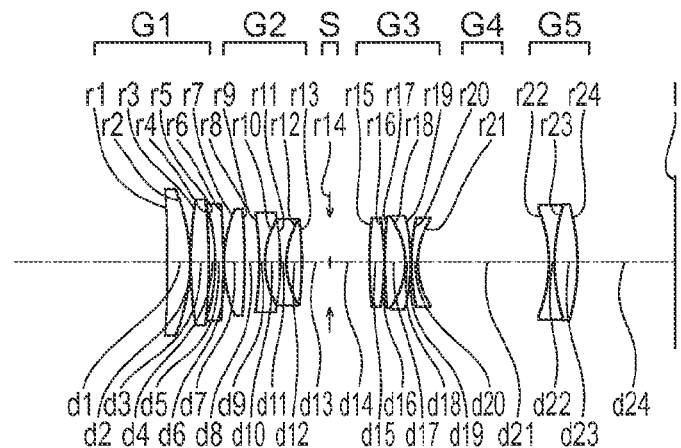
FIGS. 3A, 3B, 3C, and 3D are cross sectional views of a taking lens system according to a third example of the present invention, similar to FIGS. 1A, 1B, 1C, and 1D.
Figure 3B:
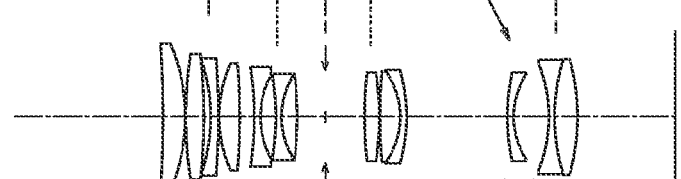
Figure 3C:
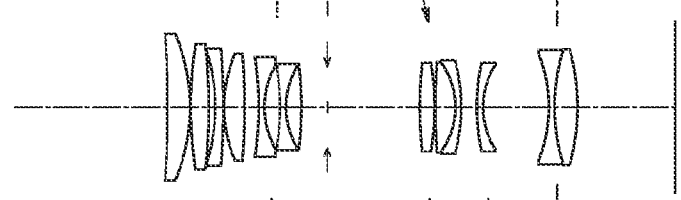
Figure 3D:
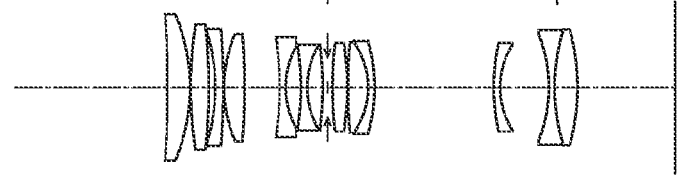

In the following, embodiments and examples of the taking lens system and the image pickup apparatus according to the present invention will be described in detail with reference to the drawings. It should be understood that the present invention is not limited by the embodiments and examples.

A taking lens system according to a embodiment comprises a frontmost lens unit that is arranged closest to the object side, a rearmost lens unit that is arranged closest to the image side, and a plurality of lens units that are arranged between the frontmost lens unit and the rearmost lens unit, wherein one of the plurality of lens units is a first focusing lens unit; in a first shooting mode, only the first focusing lens unit moves toward the image side during focusing from an infinite object distance to a close object distance; in a second shooting mode, at least two lens units in the taking lens system move during focusing from an infinite object distance to a close object distance; in the state in which the taking lens system is focused on an object at infinity, the positions of the first focusing lens unit and at least one lens unit in the taking lens system in the first shooting mode are different from those in the second shooting mode; and $M_{n1} > M_{n2}$ is satisfied, where $M_{n1}$ is the distance between the first focusing lens unit and the image plane in the first shooting mode, and $M_{n2}$ is the distance between the first focusing lens unit and the image plane in the second shooting mode, both in the state in which the taking lens system is focused on an object at infinity.

The taking lens system according to this embodiment includes a plurality of lens units arranged between the frontmost lens unit and the rearmost lens unit, and one of the plurality of lens units serves as the first focusing lens unit. Therefore, focusing is performed only by the first focusing lens unit or by the first focusing lens unit and other lens unit(s). With this configuration, the lens units moved for focusing can be differentiated, for example, among different shooting functions.

Specifically, in the case of the taking lens system according to this embodiment, during focusing from an infinite object distance to a close object distance, while only the first focusing lens unit moves toward the image side in the first shooting mode, at least two lens units included in the taking lens system move in the second shooting mode.

Thus, in the first shooting mode, since only one lens unit or the first focusing lens unit is moved for focusing, the weight of the moving lens unit can be made light in weight. Reduction in the weight of the moving lens unit is advantageous for reduction in the power consumption (driving power consumption) in the focusing operation and reduction in the driving noise. In cases where the first focusing lens unit is moved in wobbling, reduction in the power consumption (driving power consumption) in wobbling and reduction in driving noise can be achieved. The "wobbling" mentioned herein refers to an operation in which the focusing lens unit is moved by a small amount.

In video shooting, shooting of video is performed while recording ambient sound. During video shooting, focusing operation and wobbling are performed frequently. As described above, in the first shooting mode, reduction in the power consumption and driving noise during focusing operation and wobbling can be achieved. For the above reasons, the first shooting mode is suitably used, for example, in the video shooting.

On the other hand, in the second shooting mode, at least two lens units in the taking lens system move for focusing. In the second shooting mode, since the number of moving lens units is at least two, aberration variation caused with the movement of the lens units can be made smaller and the shooting magnification (at the maximum shooting magnification) can be made larger than in the first shooting mode. Thus, in the second shooting mode, it is possible to keep the optical performance of the lens system high.

In the still image shooting, required optical performance is higher than that in the video shooting. On the other hand, focusing operation and wobbling are rarely performed during the shooting (namely at the moment of shooting). As described above, in the second shooting mode, high optical performance can be achieved with the lens system. For this reason, the second shooting mode is suitably used, for example, in the still image shooting.

In the taking lens system according to this embodiment, in the state in which the taking lens system is focused on an object at infinity, the positions of the first focusing lens unit and at least one lens unit in the taking lens system in the first shooting mode are different from those in the second shooting mode.

With this feature, high optical performance different from that in the first shooting mode can be achieved in the second shooting mode.

Moreover, in the taking lens system according to this embodiment, the condition $M_{n1} > M_{n2}$ holds in the state in which the taking lens system is focused on an object at infinity, where $M_{n1}$ is the distance between the first focusing lens unit and the image plane in the first shooting mode, and $M_{n2}$ is the distance between the first focusing lens unit and the image plane in the second shooting mode, both in the state in which the taking lens system is focused on an object at infinity.

During focusing, the first focusing lens unit moves over a predetermined range. The predetermined range defines the amount of movement of the first focusing lens unit. As described above, in the first shooting mode, only the first focusing lens unit moves during focusing from an infinite object distance to a close object distance. In order to effect focusing by the first focusing lens unit alone, it is preferred that the amount of movement of the first focusing lens unit be made as large as possible.

If the condition $M_{n1} > M_{n2}$ is satisfied in the state in which the taking lens system is focused on an object at infinity, the first focusing lens unit can be located closer to the object side in the first shooting mode than in the second shooting mode. In consequence, the distance between the first focusing lens unit and the lens unit located on the image side thereof can be made large. Thus, in the first shooting mode, the amount of movement of the first focusing lens unit can be large, and therefore focusing can be effected by moving only the first focusing lens unit.

In the taking lens system according to this embodiment, it is preferred that the first focusing lens unit have a negative refractive power and that the lens units arranged on the object side of the first focusing lens unit as a whole have a positive refractive power.

This feature enables the taking lens system to be focused on an object at closer distance when the first focusing lens unit is shifted closer to the image side. In other words, the distance at which the taking lens system can be focused can be made shorter in the close object distance range.

In the taking lens system according to this embodiment, it is preferred that the frontmost lens unit and the rearmost lens unit be stationary during focusing from an infinite object distance to a close object distance in the second shooting mode.

As described above, at least two lens units move during focusing in the second shooting mode. Consequently, sound or noise generated by the movement of the lens units is larger in the second shooting mode than in the first shooting mode. However, as the frontmost lens unit and the rearmost lens unit are stationary, noise leaking to the outside can be made smaller when the focusing operation is performed in the second shooting mode. In addition, the entrance of dust into the taking lens system can be reduced. An exemplary way of keeping the frontmost lens unit and the rearmost lens unit stationary is to fix them by adhesive. As another method, these lens units may be fixed by screws with the use of pressing members. This method will improve the sealing of the space defined between the frontmost lens unit and rearmost lens unit, thereby providing more reliable reduction of noise leaking to the outside and more reliable prevention of the entrance of dust.

In the taking lens system according to this embodiment, it is preferred that one lens unit among the at least two lens units have a negative refractive power and another lens unit among the at least two lens units have a positive refractive power and that the at least two lens units that move during focusing from an infinite object distance to a close object distance in the second shooting mode do not include the first focusing lens unit.

This feature facilitates reduction in aberration variation during focusing in the second shooting mode. Furthermore, this feature is advantageous for achieving both reduction in the distance at which the taking lens system can be focused in the close object distance range and excellent optical performance.

In the taking lens system according to this embodiment, it is preferred that one lens unit among the at least two lens units that move during focusing from an infinite object distance to a close object distance in the second shooting mode be the first focusing lens unit.

This feature facilitates reduction in aberration variation during focusing in the second shooting mode. Furthermore, this feature is advantageous for achieving both reduction in the distance at which the taking lens system can be focused in the close object distance range and excellent optical performance.

In the taking lens system according to this embodiment, it is also preferred that the first focusing lens unit have a negative refractive power and consist of two or less lenses and that the following conditional expression (1) be satisfied:

$$-1.2 \le f_n/f_{inf1} \le -0.2 \tag{1},$$

where $f_n$ is the focal length of the first focusing lens unit, and $f_{inf1}$ is the focal length of the entire taking lens system in the first shooting mode in the state in which the taking lens system is focused on an object at infinity.

This feature facilitates both reduction in the weight of the first focusing lens unit and reduction in the amount of movement of the first focusing lens unit. In addition, the first focusing lens unit consisting of two or less lenses is advantageous for reduction in the weight of the focusing lens unit. Conditional expression (1) specifies a preferred range of the focal length of the first focusing lens unit.

If the first focusing lens unit has an appropriate negative refractive power so that the lower limit value of conditional expression (1) is reached, the amount of movement of the first focusing lens unit can be made small. In addition, the effective diameter of the first focusing lens unit can be made small, facilitating reduction in the load on the mechanical unit for performing the focusing operation. The amount of movement of the first focusing lens unit mentioned here refers to the distance between the position of the first focusing lens unit in the state in which the taking lens system is focused on an object at infinity and the position of the first focusing lens unit in the state in which the taking lens system is focused on an object at a close distance.

It is preferred that the negative refractive power of the first focusing lens unit be prevented from being excessively high so that the upper limit value of conditional expression (1) is not exceeded. This allows to reduce the required precision in the stop position of the first focusing lens unit in the focusing operation. In addition, not exceeding the upper limit value of conditional expression (1) is advantageous for reduction in aberration variation caused by the focusing operation.

In the taking lens system according to this embodiment, it is also preferred that the first focusing lens unit consist of one lens.

This configuration allows further reduction in the weight of the first focusing lens unit. This reduction in the weight can lead to reduction in the driving power, reduction in the noise, and reduction in the required precision in the stop position in the focusing operation. Thus, the first focusing lens unit consisting of one lens is advantageous for weight reduction, which involves other advantages.

In the taking lens system according to this embodiment, it is preferred that the first focusing lens unit have a negative refractive power, that the taking lens system include a lens unit having a positive refractive power arranged immediately in front and on the object side of the first focusing lens unit, that the plurality of lens units include the lens unit having a positive refractive power, that the at least one lens unit include the lens unit having a positive refractive power, and that the following conditional expressions (2) and (3) be satisfied:

$$0 < M_{p12}/f_{inf2} \leq 0.45 \quad (2) \text{ and}$$

$$0.1 \leq M_{p12}/M_{n12} \leq 3.0 \quad (3)$$

where $M_{p12} = M_{p1} - M_{p2}$, $M_{n12} = M_{n1} - M_{n2}$, $M_{p1}$ is the distance between the lens unit having a positive refractive power and the image plane in the first shooting mode, $M_{p2}$ is the distance between the lens unit having a positive refractive power and the image plane in the second shooting mode, $M_{n1}$ is the distance between the first focusing lens unit and the image plane in the first shooting mode, $M_{n2}$ is the distance between the first focusing lens unit and the image plane in the second shooting mode, and $f_{inf2}$ is the focal length of the entire taking lens system in the second shooting mode, where all the distances and focal lengths are those in the state in which the taking lens system is focused on an object at infinity.

It is preferred that the lens unit having a positive refractive power and the first focusing lens unit be located closer to the object side in the first shooting mode than in the second shooting mode in the state in which the taking lens system is focused on an object at infinity. This feature makes it easier to provide a required amount of movement of the first focusing lens unit in the first shooting mode.

$M_{p12}$ is a difference in position between the position of the lens unit having a positive refractive power in the first shooting mode and the position of the lens unit having a positive refractive power in the second shooting mode. Conditional expression (2) specifies a preferred range of the difference in position. This difference in position represents the amount of shift of the lens unit having a positive refractive power. Since the value of $M_{p12}$ is positive, the lens unit having a positive refractive power is located closer to the object side in the first shooting mode than in the second shooting mode in the state in which the taking lens system is focused on an object at infinity.

It is preferred that the amount of shift of the lens unit having a positive refractive power be appropriately large so that the lower limit value of conditional expression (2) is reached. This is advantageous for allowing an appropriate amount of shift of the first focusing lens unit.

It is preferred that the upper limit value of conditional expression (2) be not exceeded. This facilitates reduction in aberration variation caused by the focusing operation both in the first shooting mode and the second shooting mode.

Conditional expression (3) specifies a preferred range of the amount of shift of the first focusing lens unit in relation to the amount of shift of the lens unit having a positive refractive power. Conditional expression (3) is set on the premise that conditional expression (2) is satisfied.

It is preferred that the amount of shift of the lens unit having a positive refractive power be so large that the lower limit value of conditional expression (3) is reached and that the amount of shift of the first focusing lens unit be so large that the upper limit value of conditional expression (3) is not exceeded. This makes aberration variation caused by the shift of the lens unit having a positive refractive power small and leads to an appropriate amount of shift of the first focusing lens unit.

It is preferred that the lower limit value of conditional expression (3) be reached particularly in the case where the first focusing lens unit has a wobbling function. This can prevent a physical contact and collision of the first focusing lens unit and the lens unit having a positive refractive power from occurring.

In the taking lens system according to this embodiment, it is preferred that the frontmost lens unit and the rearmost lens unit be stationary during focusing from an infinite object distance to a close object distance both in the first shooting mode and in the second shooting mode.

With this feature, noise generated during the focusing operation can be reduced both in the first shooting mode and in the second shooting mode, and the entrance of dust into the taking lens system can be reduced. The same advantages can also be enjoyed upon switching between the state in which the taking lens is focused on an object at infinity in the first shooting mode and the state in which the taking lens is focused on an object at infinity in the second shooting mode. To keep the frontmost lens unit and the rearmost lens unit stationary, these lens units may be fixed by adhesion or other methods as described before.

It is preferred that the taking lens system according to this embodiment include a second focusing lens unit and a third focusing lens unit provided between the frontmost lens unit and the first focusing lens unit, that the plurality of lens units include the second focusing lens unit and the third focusing lens unit, and that during focusing from an infinite object distance to a close object distance in the second shooting mode, the second focusing lens unit and the third focusing lens unit move.

This configuration is advantageous for reduction of the distance at which the taking lens system can be focused in the close object distance range while achieving reduction of aberration variation that may be caused thereby.

Furthermore, in the taking lens system according to this embodiment, it is preferred that the second focusing lens unit have a negative refractive power, that the third focusing lens unit have a positive refractive power, that the third focusing lens unit be located between the second focusing lens unit and the first focusing lens unit, and that during focusing from an infinite object distance to a close object distance in the second shooting mode, the second focusing lens unit move toward the image side and the third lens unit move toward the object side.

With this configuration, the absolute value of the image magnification in shooting an object at a close distance can be made larger while reducing change in the overall length of the taking lens system. While positive spherical aberration and positive curvature of field are generated with the movement of the second focusing lens unit toward the image side, negative spherical aberration and negative curvature of field are generated with the movement of the third focusing lens unit toward the object side. Therefore, generated aberrations (aberration variations) can be cancelled each other out with respect to both spherical aberration and curvature of field. In consequence, focusing on objects at close distances, in particular focusing on closer or very close objects can be achieved while maintaining excellent aberration correction.

Furthermore, in the taking lens system according to this embodiment, it is preferred that the third focusing lens unit be arranged immediately in front and on the object side of the first focusing lens unit, and that the third lens unit be located closer to the object side in the first shooting mode than in the first shooting mode.

Upon switching between the state in which the taking lens is focused on an object at infinity in the first shooting mode and the state in which the taking lens is focused on an object at infinity in the second shooting mode, lens units are shifted. With above configuration, the lens units shifted upon switching between the states and the third focusing lens unit can be made common. Therefore, the number of shifted lens units can be prevented from increasing, leading to cost reduction.

In the taking lens system according to this embodiment, it is preferred that the frontmost lens unit have a positive refractive power.

This is advantageous for providing an appropriate working distance in shooting a very close object.

In the taking lens system according to this embodiment, it is preferred that the first focusing lens unit move back and forth along the direction of the optical axis by a predetermined movement amount and that the predetermined movement amount be smaller than the amount of movement during focusing from an infinite object distance to a close object distance in the first shooting mode.

With the above feature, the first focusing lens unit can serve as what is called a wobbling lens unit. For this purpose, it is preferred that the predetermined amount of movement be such an amount that causes the contrast of an object image to change to enable detection of the focusing state. The first focusing lens unit is a lens unit that can be made small and light in weight advantageously. Therefore, providing the first focusing lens unit with the wobbling function is more advantageous for reduction of electrical power for driving lens units than moving other lens unit(s) back and forth.

It is also preferred that the taking lens system according to this embodiment satisfy the following conditional expression (4):

$$0.3 \leq \beta_{inf2MAX} \leq 1.5 \quad (4),$$

where $\beta_{inf2MAX}$ is the absolute value of the highest image magnification of the taking lens system in the second shooting mode.

In the second shooting mode, the image magnification changes with change in the focusing distance between an infinite object distance and a close object distance. The image magnification $\beta_{inf2MAX}$ is the highest value of the image magnification thus changing. If conditional expression (4) is satisfied, an object image of a high image magnification can be obtained while achieving shortness in the overall length of the taking lens system and predetermined optical performance.

If the highest image magnification is larger than the lower limit value of conditional expression (4), object images having larger image magnifications can be obtained while achieving predetermined optical performance.

To achieve shortness in the overall length of the taking lens system and predetermined optical performance, it is preferred that the highest image magnification be not excessively high so that the upper limit value of conditional expression (4) is not exceeded.

It is also preferred that the taking lens system according to this embodiment satisfy the following conditional expressions (5) and (6):

$$0.01 \leq M_{n12}/f_{inf2} \leq 0.60 \quad (5)$$

$$0.1 \leq M_{ninf1MAX}/f_{inf1} \leq 0.5 \quad (6),$$

where $M_{n12} = M_{n1} - M_{n2}$, $M_{ninf1MAX} = M_{n3} - M_{n4}$, $M_{n1}$ is the distance between the first focusing lens unit and the image plane in the first shooting mode in the state in which the taking lens system is focused on an object at infinity, $M_{n2}$ is the distance between the first focusing lens unit and the image plane in the second shooting mode in the state in which the taking lens system is focused on an object at infinity, $M_{n3}$ is the distance between the first focusing lens unit and the image plane in the state in which the first focusing lens unit is located farthest from the image plane in the first shooting mode, $M_{n4}$ is the distance between the first focusing lens unit and the image plane in the state in which the first focusing lens unit is located closest to the image plane in the first shooting mode, $f_{inf1}$ is the focal length of the entire taking lens system in the first shooting mode in the state in which the taking lens system is focused on an object at infinity, and $f_{inf2}$ is the focal length of the entire taking lens system in the second shooting mode in the state in which the taking lens system is focused on an object at infinity.

Conditional expressions (5) and (6) specify preferable ranges of the amount of movement of the first focusing lens unit.

It is preferred that the lower limit value of conditional expression (5) be reached. This is advantageous for making the amount of movement of the first focusing lens unit appropriately large.

It is preferred that the upper limit value of conditional expression (5) be not exceeded. This facilitates reduction of aberration variation caused by change in the position of the first focusing lens unit.

It is preferred that the amount of movement of the first focusing lens unit be appropriately large so that the lower limit value of conditional expression (6) is reached. This is advantageous for reduction of the shooting distance.

It is preferred that the amount of movement of the first focusing lens unit be not excessively large so that the upper limit value of conditional expression (6) is not exceeded. This is advantageous for reduction in the size of the mechanical and/or other components.

An image pickup apparatus according to one embodiment includes the taking lens system described in the foregoing and an image pickup element that is disposed on the image side of the taking lens system and converts an image formed by the taking lens system into an electrical signal.

With the equipment of the above-described taking lens system, there can be provided an image pickup apparatus enjoying the advantages of this lens system.

To enjoy the advantages more definitely, it is preferred that the upper limit value and the lower limit value in the conditional expressions described above be modified as follows to further limit the respective numerical ranges.

In conditional expression (1), it is preferred that the lower limit value be −0.8, more preferably −0.6 and that the upper limit value be −0.28, more preferably −0.31.

In conditional expression (2), it is preferred that the lower limit value be 0.05, more preferably 0.08 and that the upper limit value be 0.3, more preferably 0.18.

In conditional expression (3), it is preferred that the lower limit value be 0.4, more preferably 0.53 and that the upper limit value be 2.0, more preferably 1.0.

In conditional expression (4), it is preferred that the lower limit value be 0.5, more preferably 0.7 and that the upper limit value be 1.2, more preferably 1.0.

In conditional expression (5), it is preferred that the lower limit value be 0.1, more preferably 0.12 and that the upper limit value be 0.4, more preferably 0.2.

In conditional expression (6), it is preferred that the lower limit value be 0.13, more preferably 0.17 and that the upper limit value be 0.4, more preferably 0.3.

In the taking lens system, two or more of the features described above may be adopted in combination. This is advantageous for achieving better taking lens system and image pickup apparatus. Any possible combination of features may be adopted.

In the following, examples of the taking lens system and the image pickup apparatus according to the present invention will be described in detail with reference to the drawings. It should be understood that the present invention is not limited by the examples.

In the following, first to ninth examples of the taking lens system according to the present invention will be described. FIGS. 1A to 1D through 9A to 9D are cross sectional views of the lens systems according to the first to ninth examples. In FIGS. 1A to 1D through 9A to 9D, a first lens unit is denoted by G1, a second lens unit is denoted by G2, an aperture stop is denoted by S, a third lens unit is denoted by G3, a fourth lens unit is denoted by G4, a fifth lens unit is denoted by G5, and the image plane is denoted by I. An image pickup element having an image pickup surface is arranged at the position of the image plane I.

While in FIGS. 1A to 1D through 9A to 9D no optical elements are provided between the fifth lens unit G5 and the image plane I, there may be provided in this space optical elements such as a vibration filter that flicks off adhering dust by vibration, a low pass filter including three plane parallel plates arranged in a stack, a filter that restricts the transmitted wavelength range, a plane parallel plate or the like such as a cover glass for protecting the image pickup surface of the image pickup element (CCD or CMOS). In cases where the taking lens system is used as an interchangeable lens, the image pickup element and the aforementioned optical elements may be provided in the camera body.

Among the cross sectional views of the taking lens systems according to the examples, FIGS. 1A, 2A, 3A, 4A, 5A, 6A, 7A, 8A, and 9A are cross sectional views of the lens systems in the state in which they are focused on an object at infinity in the first shooting mode, FIGS. 1B, 2B, 3B, 4B, 5B, 6B, 7B, 8B, and 9B are cross sectional views of the lens systems in the state in which they are focused on an object at a close distance in the first shooting mode, FIGS. 1C, 2C, 3C, 4C, 5C, 6C, 7C, 8C, and 9C are cross sectional views of the lens systems in the state in which they are focused on an object at infinity in the second shooting mode, and FIGS. 1D, 2D, 3D, 4D, 5D, 6D, 7D, 8D, and 9D are cross sectional views of the lens systems in the state in which they are focused on an object at a close distance in the second shooting mode. In the cross sectional views, the broken lines indicate that the relevant lens units are kept always stationary irrespective of changes in the focusing state and switching of the shooting mode, and the dotted lines indicate that the relevant lens units are stationary upon changes in the focusing state. The double sided arrow illustrated below the fourth lens unit G4 in FIGS. 1B, 2B, 3B, 4B, 5B, 6B, 7B, 8B, and 9B indicates that wobbling is performed with the fourth lens unit G4.

As shown in FIGS. 1A to 1D, 2A to 2D, 3A to 3D, 4A to 4D, 5A to 5D, 6A to 6D, 7A to 7D, and 9A to 9D, the taking lens systems according to the first to seventh and ninth examples each include, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

As shown in FIGS. 8A to 8D, the taking lens system according to the eighth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a negative refractive power.

In all the examples, the first lens unit G1 is the frontmost lens unit, and the fifth lens unit G5 is the rearmost lens unit. The second lens unit G2, the third lens unit G3, and the fourth lens unit G4 constitute the second focusing lens unit, the third focusing lens unit, and the first focusing lens unit respectively.

In the lens system according to the first example, the first lens unit G1 is composed of two biconvex positive lenses, a biconcave negative lens, and a biconvex positive lens. The second lens unit G2 is composed of a biconcave negative lens and a cemented lens made up of a biconcave negative lens and a biconvex positive lens. The third lens unit G3 is composed of a biconvex positive lens and a cemented lens made up of a biconvex positive lens and a negative meniscus lens having a convex surface directed toward the image side. The fourth lens unit G4 is composed of a negative meniscus lens having a convex surface directed toward the object side. The fifth lens unit G5 is composed of a biconcave negative lens and a biconvex positive lens. The lens elements in each lens unit are arranged in the mentioned order from the object side.

The lens system according to the second example differs from the lens system according to the first example in the following respects: the negative lens in the first lens unit G1 is a negative meniscus lens having a convex surface directed toward the image side; and the positive lens located closest to the image side in the first lens unit G1 is a positive meniscus lens having a convex surface directed toward the object side.

The lens system according to the third example differs from the lens system according to the first example in the following respect: the positive lens located closest to the object side in the first lens unit G1 is a positive meniscus lens having a convex surface directed toward the image side.

The configuration of the lens system according to the fourth example is the same as that according to the third example.

The lens system according to the fifth example differs from the lens system according to the first example in the following respects: the positive lens located closest to the image side in the first lens unit G1 is a positive meniscus lens having a convex surface directed toward the object side; the object side negative lens in the second lens unit G2 is a negative meniscus lens having a convex surface directed toward the object side; and the image side positive lens in the third lens unit G3 is a positive meniscus lens having a convex surface directed toward the image side.

The configuration of the lens system according to the sixth example is the same as that according to the third example.

The lens system according to the seventh example differs from the lens system according to the third example in the following respect: the image side positive lens in the third lens unit G3 is a positive meniscus lens having a convex surface directed toward the image side.

The lens system according to the eighth example differs from the lens system according to the first example in the following respect: the positive lens in the fifth lens unit G5 is a positive meniscus lens having a convex surface directed toward the object side.

The lens system according to the ninth example differs from the lens system according to the first example in the following respects: the positive lens located closest to the image side in the first lens unit G1 is a positive meniscus lens having a convex surface directed toward the object side; and the object side negative lens in the second lens unit G2 is a negative meniscus lens having a convex surface directed toward the object side.

In the lens systems according to the first to ninth examples, the three lens units including the first lens unit G1, the second lens unit G2, and the third lens units G3 are located on the object side of the fourth lens unit G4 (which constitutes the first focusing lens unit). The focal length of the three lens units as a whole is 38.382 mm in the first example. Thus, in the first example, the refractive power of the aforementioned three lens units as a whole is positive. In the second to ninth examples also, the refractive power of the corresponding three lens units as a whole is positive, as with the first example, though specific values of the focal length of the three lens units as a whole in these examples are not presented here.

How the lens units and the aperture stop (which will be collectively referred to as the optical components) move is shown in Tables 1 to 4. In Tables 1 to 4, "OB" indicates that the optical component moves toward the object side, "IM" indicates that the optical component moves toward the image side, and "S" indicates that the optical component is stationary.

How the lens units move during focusing from an infinite object distance to a close object distance in the first shooting mode is shown in Table 1. The movement of each lens unit can also be seen from FIGS. 1A and 1B through 9A and 9B.

TABLE 1

| | example | | | | | | | | |
|---|---|---|---|---|---|---|---|---|---|
| | 1 | 2 | 3 | 4 | 5 | 6 | 7 | 8 | 9 |
| first lens unit G1 | S | S | S | S | S | S | S | S | S |
| second lens unit G2 | S | S | S | S | S | S | S | S | S |
| aperture stop S | S | S | S | S | S | S | S | S | S |
| third lens unit G3 | S | S | S | S | S | S | S | S | S |
| fourth lens unit G4 | IM | IM | IM | IM | IM | IM | IM | IM | IM |
| fifth lens unit G5 | S | S | S | S | S | S | S | S | S |

How the lens units move during focusing from an infinite object distance to a close object distance in the second shooting mode is shown in Table 2. The movement of each lens unit can also be seen from FIGS. 1C and 1D through 9C and 9D.

TABLE 2

| | example | | | | | | | | |
|---|---|---|---|---|---|---|---|---|---|
| | 1 | 2 | 3 | 4 | 5 | 6 | 7 | 8 | 9 |
| first lens unit G1 | S | S | S | S | S | S | S | S | S |
| second lens unit G2 | IM | IM | IM | IM | IM | IM | IM | IM | IM |
| aperture stop S | S | S | S | S | S | S | S | S | S |
| third lens unit G3 | OB | OB | OB | OB | OB | OB | OB | OB | OB |
| fourth lens unit G4 | S | S | IM | OB | IM | IM | IM | S | S |
| fifth lens unit G5 | S | S | S | S | S | S | S | S | S |

As will be seen from Table 2, in the second shooting mode, the first lens unit G1 (frontmost lens unit) and the fifth lens unit G5 (rearmost lens unit) are stationary during focusing from an infinite object distance to a close object distance. The first lens unit G1 (frontmost lens unit) and the fifth lens unit G5 (rearmost lens unit) are stationary during focusing from an infinite object distance to a close object distance in the first shooting mode also (see Table 1). The aperture stop S is also stationary in the first and the second shooting modes. To keep the first lens unit G1, the aperture stop S, and the fifth lens unit G5 stationary, these optical components may be fixed by adhesion. They may be fixed by other methods as described before.

In the second shooting mode, besides the fourth lens unit G4 (first focusing lens unit), two lens units including the second lens unit G2 (lens unit having a negative refractive power/second focusing lens unit) and the third lens unit G3 (lens unit having a positive refractive power/third focusing lens unit) move during focusing from an infinite object distance to a close object distance. The second lens unit G2 moves toward the image side, and the third lens unit moves toward the object side.

In numerical examples presented later, for example, in the first example, the distance d14 between the aperture stop S and the third lens unit is 8.00 in the first shooting mode and 1.00 in the second shooting mode in the state in which the lens system is focused on an object at a close distance. Thus, the third lens unit G3 is located closer to the object side in the first shooting mode than in the second shooting mode. This also applies to the second to ninth examples.

The movement or shift of the second lens unit is shown Table 3. In Table 3, row (A) shows the movement with the shift from the state in which the lens system is focused on an object at infinity in the first shooting mode to the state in which the lens system is focused on an object at infinity in the second shooting mode (FIGS. 1A and 1C through 9A and 9C), row (B) shows the movement with the shift from the state in which the lens system is focused on an object at infinity in the first shooting mode to the state in which the lens system is focused on an object at a close distance in the second shooting mode (FIGS. 1A and 1D through 9A and 9D), and row (C) shows the movement with the shift from the state in which the lens system is focused on an object at infinity in the second shooting mode to the state in which the lens system is focused on an object at a close distance in the second shooting mode (FIGS. 1C and 1D through 9C and 9D).

TABLE 3

| | example | | | | | | | | |
|---|---|---|---|---|---|---|---|---|---|
| | 1 | 2 | 3 | 4 | 5 | 6 | 7 | 8 | 9 |
| (A) | OB | OB | S | OB | OB | IM | IM | OB | OB |
| (B) | IM | IM | IM | IM | IM | IM | IM | IM | IM |
| (C) | IM | IM | IM | IM | IM | IM | IM | IM | IM |

The movement or shift of the third lens unit is shown in Table 4. In Table 4, row (D) shows the movement with the shift from the state in which the lens system is focused on an object at infinity in the first shooting mode to the state in which the lens system is focused on an object at infinity in the second shooting mode (FIGS. 1A and 1C through 9A and 9C), and row (E) shows the movement with the shift from the state in which the lens system is focused on an object at infinity in the first shooting mode to the state in which the lens system is focused on an object at a close distance in the second shooting mode (FIGS. 1A and 1D through 9A and 9D).

TABLE 4

| | example | | | | | | | | |
|---|---|---|---|---|---|---|---|---|---|
| | 1 | 2 | 3 | 4 | 5 | 6 | 7 | 8 | 9 |
| (D) | IM | IM | IM | IM | IM | IM | IM | IM | IM |
| (E) | OB | OB | OB | OB | OB | OB | OB | OB | OB |

As will be seen from row (D) in Table 4, the third lens unit G3 is located closer to the object side in the first shooting mode than in the second shooting mode. The third lens unit G3 is arranged immediately in front and on the object side of the fourth lens unit G4 and has a positive refractive power. As will be seen from row (E) in Table 4, the fourth lens unit G4 is located closer to the object side in the first shooting mode than in the second shooting mode.

The movement or shift of the fourth lens unit is shown in Table 5. In Table 5, row (F) shows the movement with the shift from the state in which the lens system is focused on an object at infinity in the first shooting mode to the state in which the lens system is focused on an object at infinity in the second shooting mode (FIGS. 1A and 1C through 9A and 9C), and row (G) shows the movement with the shift from the state in which the lens system is focused on an object at a close distance in the first shooting mode to the state in which the lens system is focused on an object at infinity in the second shooting mode (FIGS. 1B and 1C through 9B and 9C).

TABLE 5

| | example | | | | | | | | |
|---|---|---|---|---|---|---|---|---|---|
| | 1 | 2 | 3 | 4 | 5 | 6 | 7 | 8 | 9 |
| (F) | IM | IM | IM | IM | IM | IM | IM | IM | IM |
| (G) | OB | OB | OB | IM | OB | OB | OB | OB | OB |

The fourth lens unit G4 moves back and forth by a predetermined amount of movement in addition to movement for focusing from an infinite object distance to a close object distance. This back-and-forth motion is wobbling, which is performed even when the fourth lens unit G4 is stationary. The predetermined amount of movement is smaller than the amount of movement of the fourth lens unit during focusing from an infinite object distance to a close object distance.

Wobbling is ceaselessly moving the focusing lens unit back and forth by a small amount about the in-focus position. This motion enables detection of a change in the contrast of the image. From the change in the contrast, a change in the focus state (defocus) can be detected.

In the following, numerical data of the above-described examples are presented. Among notations used in the numerical data other than those mentioned above, r is the radius of curvature of each lens surface, d is the distance between lens surfaces, nd is the refractive index of each lens for the d-line, vd is the Abbe constant of each lens, "focal length" refers to the focal length of the entire lens system, F no. is the F-number, ω is the half angle of view, f1, f2, . . . are focal length of the respective lens units. The overall length is the distance from the frontmost lens surface to the rearmost lens surface plus back focus. Further, fb (back focus) is the distance from the rearmost lens surface to the paraxial image plane represented by an equivalent air distance.

In the numerical data, "First infinite distance" refers to the state in which the lens system is focused on an object at infinity in the first shooting mode, "First close distance" refers to the state in which the lens system is focused on an object at a close distance in the first shooting mode, "Second infinite distance" refers to the state in which the lens system is focused on an object at infinity in the second shooting mode, and "Second close distance" refers to the state in which the lens system is focused on an object at a close distance in the second shooting mode.

Example 1

| Unit mm | | | | |
|---|---|---|---|---|
| Surface data | | | | |
| Surface no. | r | d | nd | vd |
| Object plane | ∞ | ∞ | | |
| 1 | 221.925 | 4.50 | 1.65262 | 40.21 |
| 2 | −56.848 | 0.10 | | |
| 3 | 57.542 | 3.59 | 1.64755 | 57.96 |
| 4 | −418.348 | 1.30 | | |
| 5 | −60.491 | 1.60 | 1.84624 | 23.79 |
| 6 | 356.420 | 0.10 | | |
| 7 | 32.467 | 4.06 | 1.49184 | 69.73 |
| 8 | −230.963 | Variable | | |
| 9 | −125.899 | 1.20 | 1.70704 | 55.47 |
| 10 | 20.165 | 3.02 | | |
| 11 | −50.372 | 1.20 | 1.65856 | 32.00 |
| 12 | 18.484 | 3.07 | 1.84190 | 25.40 |
| 13 | −99.983 | Variable | | |
| 14 (stop) | ∞ | Variable | | |
| 15 | 84.248 | 2.96 | 1.59429 | 60.87 |
| 16 | −35.357 | 0.10 | | |
| 17 | 35.942 | 4.00 | 1.66755 | 57.05 |
| 18 | −22.599 | 1.20 | 1.84666 | 23.78 |
| 19 | −263.159 | Variable | | |
| 20 | 112.142 | 1.20 | 1.72763 | 54.75 |
| 21 | 18.598 | Variable | | |
| 22 | −25.000 | 1.20 | 1.48826 | 70.17 |
| 23 | 40.000 | 4.50 | 1.87378 | 34.67 |
| 24 | −36.507 | 16.58 | | |

-continued

| Unit mm | |
|---|---|
| Image plane (Image pickup surface) | ∞ |

Various data

| | | |
|---|---|---|
| Image height | 11.15 | |
| Lens total length | 100.582 | |
| fb | 16.579 | |

| | First infinite distance | First close distance |
|---|---|---|
| Magnification | 0 | −0.30 |
| Focal length | 72.23 | 57.55 |
| Fno. | 2.88 | 3.11 |
| Angle of view 2ω | 17.23 | 16.24 |
| d8 | 4.95 | 4.95 |
| d13 | 12.44 | 12.44 |
| d14 | 8.00 | 8.00 |
| d19 | 0.14 | 8.80 |
| d21 | 19.57 | 10.91 |

| | Second infinite distance | Second close distance |
|---|---|---|
| Magnification | 0 | −1.0 |
| Focal length | 60.52 | 53.05 |
| Fno. | 2.88 | 5.80 |
| Angle of view 2ω | 20.37 | 5.57 |
| d8 | 2.81 | 16.39 |
| d13 | 14.57 | 1.00 |
| d14 | 11.76 | 1.00 |
| d19 | 3.69 | 14.45 |
| d21 | 12.25 | 12.25 |

Unit focal length f1 = 36.51   f2 = −29.83   f3 = 26.53   f4 = −30.81   f5 = 66.09

Example 2

| Unit mm | | | | |
|---|---|---|---|---|

Surface data

| Surface no. | r | d | nd | vd |
|---|---|---|---|---|
| Object plane | ∞ | ∞ | | |
| 1 | 8316.838 | 4.50 | 1.65231 | 32.49 |
| 2 | −45.159 | 0.10 | | |
| 3 | 59.876 | 3.59 | 1.62974 | 58.85 |
| 4 | −301.934 | 1.30 | | |
| 5 | −47.650 | 1.60 | 1.87324 | 34.37 |
| 6 | −1908.805 | 0.10 | | |
| 7 | 25.401 | 4.06 | 1.49179 | 69.74 |
| 8 | 295.878 | Variable | | |
| 9 | −2492.550 | 1.20 | 1.71540 | 48.47 |
| 10 | 16.137 | 3.02 | | |
| 11 | −52.153 | 1.20 | 1.64041 | 33.48 |
| 12 | 16.240 | 3.07 | 1.86343 | 34.31 |
| 13 | −69.922 | Variable | | |
| 14 (stop) | ∞ | Variable | | |
| 15 | 80.673 | 2.96 | 1.50793 | 67.92 |
| 16 | −57.818 | 0.10 | | |
| 17 | 44.229 | 4.00 | 1.69458 | 55.94 |
| 18 | −19.099 | 1.20 | 1.85141 | 25.20 |
| 19 | −52.733 | Variable | | |
| 20 | 54.807 | 1.20 | 1.83657 | 43.81 |
| 21 | 15.108 | Variable | | |
| 22 | −28.418 | 1.20 | 1.48800 | 70.20 |
| 23 | 40.000 | 4.50 | 1.86821 | 31.76 |
| 24 | −34.056 | 17.15 | | |
| Image plane | ∞ | | | |

-continued

| Unit mm | |
|---|---|
| (Image pickup surface) | |

Various data

| | | |
|---|---|---|
| Image height | 11.15 | |
| Lens total length | 100.580 | |
| fb | 17.152 | |

| | First infinite distance | First close distance |
|---|---|---|
| Magnification | 0 | −0.60 |
| Focal length | 75.91 | 52.97 |
| Fno. | 3.25 | 3.63 |
| Angle of view 2ω | 16.69 | 14.88 |
| d8 | 4.81 | 4.81 |
| d13 | 6.09 | 6.09 |
| d14 | 8.00 | 8.00 |
| d19 | 0.10 | 13.68 |
| d21 | 25.52 | 11.94 |

| | Second infinite distance | Second close distance |
|---|---|---|
| Magnification | 0 | −1.0 |
| Focal length | 66.03 | 56.95 |
| Fno. | 3.03 | 5.80 |
| Angle of view 2ω | 18.54 | 9.69 |
| d8 | 2.81 | 9.90 |
| d13 | 8.08 | 1.00 |
| d14 | 14.70 | 1.00 |
| d19 | 2.64 | 16.34 |
| d21 | 16.28 | 16.28 |

Unit focal length f1 = 37.34   f2 = −37.06   f3 = 26.69   f4 = −25.28   f5 = 53.27

Example 3

| Unit mm | | | | |
|---|---|---|---|---|

Surface data

| Surface no. | r | d | nd | vd |
|---|---|---|---|---|
| Object plane | ∞ | ∞ | | |
| 1 | −153.120 | 4.50 | 1.66725 | 47.37 |
| 2 | −38.005 | 0.10 | | |
| 3 | 66.243 | 3.59 | 1.63406 | 57.95 |
| 4 | −103.232 | 1.30 | | |
| 5 | −39.947 | 1.60 | 1.87823 | 37.39 |
| 6 | −265.288 | 0.10 | | |
| 7 | 25.464 | 4.06 | 1.48800 | 70.20 |
| 8 | −203.232 | Variable | | |
| 9 | −80.026 | 1.20 | 1.73089 | 54.45 |
| 10 | 16.544 | 3.02 | | |
| 11 | −55.279 | 1.20 | 1.64209 | 33.33 |
| 12 | 15.660 | 3.07 | 1.86130 | 33.03 |
| 13 | −74.942 | Variable | | |
| 14 (stop) | ∞ | Variable | | |
| 15 | 71.138 | 2.96 | 1.48800 | 70.20 |
| 16 | −63.595 | 0.10 | | |
| 17 | 117.510 | 4.00 | 1.68743 | 56.22 |
| 18 | −15.265 | 1.20 | 1.85801 | 27.46 |
| 19 | −32.758 | Variable | | |
| 20 | 39.116 | 1.20 | 1.60188 | 60.40 |
| 21 | 14.742 | Variable | | |
| 22 | −25.495 | 1.20 | 1.49563 | 69.29 |
| 23 | 40.000 | 4.50 | 1.83692 | 43.46 |
| 24 | −36.907 | 19.47 | | |
| Image plane (Image pickup surface) | ∞ | | | |

-continued

Unit mm

Various data

| | | |
|---|---|---|
| Image height | | 11.15 |
| Lens total length | | 100.582 |
| fb | | 19.468 |

| | First infinite distance | First close distance |
|---|---|---|
| Magnification | 0 | −0.60 |
| Focal length | 65.91 | 44.15 |
| Fno. | 3.11 | 3.67 |
| Angle of view 2ω | 18.95 | 17.30 |
| d8 | 2.81 | 2.81 |
| d13 | 5.01 | 5.01 |
| d14 | 8.00 | 8.00 |
| d19 | 0.10 | 19.76 |
| d21 | 26.28 | 6.62 |

| | Second infinite distance | Second close distance |
|---|---|---|
| Magnification | 0 | −1.0 |
| Focal length | 58.70 | 44.08 |
| Fno. | 2.88 | 5.80 |
| Angle of view 2ω | 20.34 | 11.19 |
| d8 | 2.81 | 6.82 |
| d13 | 5.01 | 1.00 |
| d14 | 18.67 | 1.00 |
| d19 | 2.90 | 23.62 |
| d21 | 12.81 | 9.77 |

Unit focal length

| f1 = 32.02 | f2 = −28.42 | f3 = 29.33 | f4 = −40.05 | f5 = 77.80 |
|---|---|---|---|---|

Example 4

Unit mm

Surface data

| Surface no. | r | d | nd | vd |
|---|---|---|---|---|
| Object plane | ∞ | ∞ | | |
| 1 | −246.883 | 4.50 | 1.64481 | 58.09 |
| 2 | −37.380 | 0.10 | | |
| 3 | 91.646 | 3.59 | 1.61028 | 36.60 |
| 4 | −88.866 | 1.30 | | |
| 5 | −33.240 | 1.60 | 1.88229 | 40.23 |
| 6 | −147.073 | 0.10 | | |
| 7 | 35.024 | 4.06 | 1.48802 | 70.20 |
| 8 | −66.541 | Variable | | |
| 9 | −36.257 | 1.20 | 1.74337 | 52.85 |
| 10 | 22.083 | 3.02 | | |
| 11 | −23.196 | 1.20 | 1.64503 | 33.33 |
| 12 | 24.380 | 3.07 | 1.86047 | 37.55 |
| 13 | −24.723 | Variable | | |
| 14 (stop) | ∞ | Variable | | |
| 15 | 79.949 | 2.96 | 1.54697 | 64.26 |
| 16 | −68.497 | 0.10 | | |
| 17 | 45.502 | 4.00 | 1.69132 | 56.07 |
| 18 | −18.417 | 1.20 | 1.85542 | 26.55 |
| 19 | −48.342 | Variable | | |
| 20 | 45.054 | 1.20 | 1.60101 | 60.46 |
| 21 | 14.197 | Variable | | |
| 22 | −36.412 | 1.20 | 1.50083 | 62.79 |
| 23 | 40.000 | 4.50 | 1.88300 | 40.77 |
| 24 | −37.873 | 14.92 | | |
| Image plane (Image pickup surface) | ∞ | | | |

Various data

| | | |
|---|---|---|
| Image height | | 11.15 |
| Lens total length | | 98.843 |
| fb | | 14.922 |

| | First infinite distance | First close distance |
|---|---|---|
| Magnification | 0 | −0.60 |
| Focal length | 53.78 | 42.70 |
| Fno. | 2.98 | 3.28 |
| Angle of view 2ω | 23.18 | 20.37 |
| d8 | 3.88 | 3.88 |
| d13 | 8.12 | 8.12 |
| d14 | 6.07 | 6.07 |
| d19 | 0.10 | 16.50 |
| d21 | 26.85 | 10.44 |

| | Second infinite distance | Second close distance |
|---|---|---|
| Magnification | 0 | −1.0 |
| Focal length | 39.61 | 43.89 |
| Fno. | 2.88 | 5.80 |
| Angle of view 2ω | 28.59 | 11.42 |
| d8 | 2.81 | 11.00 |
| d13 | 9.18 | 1.00 |
| d14 | 22.61 | 1.00 |
| d19 | 6.02 | 24.44 |
| d21 | 4.38 | 7.57 |

Unit focal length

| f1 = 35.51 | f2 = −34.73 | f3 = 26.68 | f4 = −35.00 | f5 = 50.75 |
|---|---|---|---|---|

Example 5

Unit mm

Surface data

| Surface no. | r | d | nd | vd |
|---|---|---|---|---|
| Object plane | ∞ | ∞ | | |
| 1 | 1850.029 | 4.50 | 1.68479 | 30.22 |
| 2 | −45.610 | 0.10 | | |
| 3 | 56.684 | 3.59 | 1.64657 | 58.01 |
| 4 | −239.131 | 1.30 | | |
| 5 | −46.644 | 1.60 | 1.84666 | 23.78 |
| 6 | 1439.275 | 0.10 | | |
| 7 | 20.917 | 4.06 | 1.49167 | 69.75 |
| 8 | 107.010 | Variable | | |
| 9 | 137.127 | 1.20 | 1.72833 | 45.39 |
| 10 | 14.790 | 3.02 | | |
| 11 | −49.220 | 1.20 | 1.64460 | 33.92 |
| 12 | 15.367 | 3.07 | 1.85590 | 26.70 |
| 13 | −124.726 | Variable | | |
| 14 (stop) | ∞ | Variable | | |
| 15 | 61.593 | 2.96 | 1.48846 | 70.14 |
| 16 | −36.630 | 0.10 | | |
| 17 | −2774.053 | 4.00 | 1.66549 | 57.14 |
| 18 | −18.127 | 1.20 | 1.84666 | 23.78 |
| 19 | −44.282 | Variable | | |
| 20 | 63.092 | 1.20 | 1.71258 | 55.27 |
| 21 | 17.768 | Variable | | |
| 22 | −25.769 | 1.20 | 1.54244 | 64.64 |
| 23 | 302855.432 | 4.50 | 1.68180 | 30.39 |
| 24 | −25.090 | 25.18 | | |
| Image plane (Image pickup surface) | ∞ | | | |

Various data

| | | |
|---|---|---|
| Image height | | 11.15 |
| Lens total length | | 108.582 |
| fb | | 25.178 |

-continued

Unit mm

|  | First infinite distance | First close distance |
|---|---|---|
| Magnification | 0 | −0.60 |
| Focal length | 101.25 | 60.87 |
| Fno. | 4.39 | 4.92 |
| Angle of view 2ω | 12.44 | 11.06 |
| d8 | 3.24 | 3.24 |
| d13 | 3.66 | 3.66 |
| d14 | 7.16 | 7.16 |
| d19 | 0.97 | 17.00 |
| d21 | 29.46 | 13.43 |

|  | Second infinite distance | Second close distance |
|---|---|---|
| Magnification | 0 | −1.0 |
| Focal length | 98.97 | 53.14 |
| Fno. | 4.38 | 5.80 |
| Angle of view 2ω | 12.69 | 8.34 |
| d8 | 2.81 | 5.90 |
| d13 | 4.09 | 1.00 |
| d14 | 8.56 | 1.00 |
| d19 | 1.92 | 20.28 |
| d21 | 27.11 | 16.31 |

Unit focal length

| f1 = 33.75 | f2 = −29.49 | f3 = 34.27 | f4 = −35.10 | f5 = 123.46 |
|---|---|---|---|---|

Example 6

Unit mm

Surface data

| Surface no. | r | d | nd | νd |
|---|---|---|---|---|
| Object plane | ∞ | ∞ |  |  |
| 1 | −384.561 | 4.50 | 1.66960 | 32.12 |
| 2 | −41.352 | 0.10 |  |  |
| 3 | 50.720 | 3.59 | 1.64418 | 58.12 |
| 4 | −231.483 | 1.30 |  |  |
| 5 | −42.090 | 1.60 | 1.84666 | 23.78 |
| 6 | −1306.032 | 0.10 |  |  |
| 7 | 24.583 | 4.06 | 1.48801 | 70.20 |
| 8 | −75.294 | Variable |  |  |
| 9 | −60.714 | 1.20 | 1.73719 | 53.62 |
| 10 | 15.727 | 3.02 |  |  |
| 11 | −40.972 | 1.20 | 1.64522 | 33.44 |
| 12 | 15.858 | 3.07 | 1.85923 | 28.25 |
| 13 | −58.365 | Variable |  |  |
| 14 (stop) | ∞ | Variable |  |  |
| 15 | 86.122 | 2.96 | 1.48824 | 70.17 |
| 16 | −43.966 | 0.10 |  |  |
| 17 | 196.250 | 4.00 | 1.68207 | 56.44 |
| 18 | −16.094 | 1.20 | 1.84666 | 23.78 |
| 19 | −34.370 | Variable |  |  |
| 20 | 42.804 | 1.20 | 1.55281 | 63.79 |
| 21 | 14.435 | Variable |  |  |
| 22 | −25.188 | 1.20 | 1.50883 | 67.82 |
| 23 | 57.077 | 4.50 | 1.76703 | 48.11 |
| 24 | −26.093 | 21.45 |  |  |
| Image plane (Image pickup surface) | ∞ |  |  |  |

Various data

| Image height | 11.15 |
|---|---|
| Lens total length | 100.582 |
| fb | 21.447 |

|  | First infinite distance | First close distance |
|---|---|---|

|  | First infinite distance | First close distance |
|---|---|---|
| Magnification | 0 | −0.60 |
| Focal length | 59.75 | 41.98 |
| Fno. | 3.34 | 3.82 |
| Angle of view 2ω | 21.21 | 18.70 |
| d8 | 0.14 | 0.14 |
| d13 | 6.24 | 6.24 |
| d14 | 6.06 | 6.06 |
| d19 | 4.05 | 24.13 |
| d21 | 23.74 | 3.66 |

|  | Second infinite distance | Second close distance |
|---|---|---|
| Magnification | 0 | −1.0 |
| Focal length | 64.32 | 45.50 |
| Fno. | 2.99 | 5.80 |
| Angle of view 2ω | 19.19 | 11.22 |
| d8 | 2.81 | 5.38 |
| d13 | 3.57 | 1.00 |
| d14 | 12.90 | 1.00 |
| d19 | 0.10 | 25.80 |
| d21 | 20.85 | 7.05 |

Unit focal length

| f1 = 28.35 | f2 = −24.10 | f3 = 29.90 | f4 = −40.00 | f5 = 64.81 |
|---|---|---|---|---|

Example 7

Unit mm

Surface data

| Surface no. | r | d | nd | νd |
|---|---|---|---|---|
| Object plane | ∞ | ∞ |  |  |
| 1 | −133.266 | 4.50 | 1.68542 | 43.61 |
| 2 | −33.934 | 0.10 |  |  |
| 3 | 50.701 | 3.59 | 1.64858 | 57.91 |
| 4 | −133.433 | 1.30 |  |  |
| 5 | −32.534 | 1.60 | 1.84666 | 23.78 |
| 6 | −159.283 | 0.10 |  |  |
| 7 | 33.630 | 4.06 | 1.48800 | 70.20 |
| 8 | −43.171 | Variable |  |  |
| 9 | −32.752 | 1.20 | 1.77033 | 49.87 |
| 10 | 19.603 | 3.02 |  |  |
| 11 | −23.392 | 1.20 | 1.65686 | 46.71 |
| 12 | 19.637 | 3.07 | 1.85035 | 31.61 |
| 13 | −26.582 | Variable |  |  |
| 14 (stop) | ∞ | Variable |  |  |
| 15 | 318.449 | 2.96 | 1.48800 | 70.20 |
| 16 | −35.608 | 0.10 |  |  |
| 17 | −1399.570 | 4.00 | 1.68119 | 56.47 |
| 18 | −14.673 | 1.20 | 1.84667 | 23.78 |
| 19 | −30.191 | Variable |  |  |
| 20 | 25.206 | 1.20 | 1.48802 | 70.20 |
| 21 | 13.335 | Variable |  |  |
| 22 | −32.526 | 1.20 | 1.62882 | 58.89 |
| 23 | 62.237 | 4.50 | 1.55590 | 44.92 |
| 24 | −19.977 | 17.54 |  |  |
| Image plane (Image pickup surface) | ∞ |  |  |  |

Various data

| Image height | 11.15 |
|---|---|
| Lens total length | 100.582 |
| fb | 17.535 |

|  | First infinite distance | First close distance |
|---|---|---|
| Magnification | 0 | −0.60 |
| Focal length | 59.76 | 40.81 |
| Fno. | 3.52 | 3.83 |

-continued

| Unit mm | | |
|---|---|---|
| Angle of view 2ω | 21.34 | 18.76 |
| d8 | 0.46 | 0.46 |
| d13 | 8.11 | 8.11 |
| d14 | 3.33 | 3.33 |
| d19 | 1.33 | 28.28 |
| d21 | 30.91 | 3.96 |

| | Second infinite distance | Second close distance |
|---|---|---|
| Magnification | 0 | −1.0 |
| Focal length | 60.77 | 46.62 |
| Fno. | 3.05 | 5.80 |
| Angle of view 2ω | 19.88 | 10.10 |
| d8 | 2.81 | 7.57 |
| d13 | 5.75 | 1.00 |
| d14 | 14.52 | 1.00 |
| d19 | 0.13 | 24.08 |
| d21 | 20.92 | 10.49 |

| Unit focal length | | | | |
|---|---|---|---|---|
| f1 = 27.46 | f2 = −25.40 | f3 = 32.53 | f4 = −60.01 | f5 = 106.91 |

Example 8

| Unit mm | | | |
|---|---|---|---|
| Surface data | | | |
| Surface no. | r | d | nd | vd |
| Object plane | ∞ | ∞ | | |
| 1 | 170.733 | 4.50 | 1.67906 | 56.56 |
| 2 | −62.309 | 0.10 | | |
| 3 | 55.992 | 3.59 | 1.66652 | 57.09 |
| 4 | −408.165 | 1.30 | | |
| 5 | −63.993 | 1.60 | 1.84666 | 23.78 |
| 6 | 230.919 | 0.10 | | |
| 7 | 36.352 | 4.06 | 1.48988 | 69.97 |
| 8 | −129.940 | Variable | | |
| 9 | −176.369 | 1.20 | 1.71614 | 55.14 |
| 10 | 21.573 | 3.02 | | |
| 11 | −24.019 | 1.20 | 1.67309 | 37.73 |
| 12 | 33.646 | 3.07 | 1.83539 | 24.07 |
| 13 | −41.833 | Variable | | |
| 14 (stop) | ∞ | Variable | | |
| 15 | 741.056 | 2.96 | 1.67772 | 56.62 |
| 16 | −34.053 | 0.10 | | |
| 17 | 69.172 | 4.00 | 1.60197 | 60.40 |
| 18 | −21.967 | 1.20 | 1.84666 | 23.78 |
| 19 | −60.245 | Variable | | |
| 20 | 78.301 | 1.20 | 1.72900 | 54.70 |
| 21 | 33.209 | Variable | | |
| 22 | −50.168 | 1.20 | 1.54095 | 64.77 |
| 23 | 19.947 | 3.20 | 1.70647 | 43.25 |
| 24 | 12954.948 | 16.74 | | |
| Image plane (Image pickup surface) | ∞ | | | |

| Various data | |
|---|---|
| Image height | 11.15 |
| Lens total length | 100.582 |
| fb | 16.737 |

| | First infinite distance | First close distance |
|---|---|---|
| Magnification | 0 | −0.20 |
| Focal length | 69.07 | 52.64 |
| Fno. | 2.96 | 3.00 |
| Angle of view 2ω | 17.94 | 17.88 |
| d8 | 4.85 | 4.85 |
| d13 | 15.66 | 15.66 |

-continued

| Unit mm | | |
|---|---|---|
| d14 | 8.00 | 8.00 |
| d19 | 0.10 | 15.62 |
| d21 | 17.64 | 2.12 |

| | Second infinite distance | Second close distance |
|---|---|---|
| Magnification | 0 | −1.0 |
| Focal length | 58.18 | 39.76 |
| Fno. | 2.88 | 5.80 |
| Angle of view 2ω | 21.46 | 3.00 |
| d8 | 2.81 | 19.50 |
| d13 | 17.69 | 1.00 |
| d14 | 9.53 | 1.00 |
| d19 | 8.07 | 16.61 |
| d21 | 8.13 | 8.13 |

| Unit focal length | | | | |
|---|---|---|---|---|
| f1 = 35.86 | f2 = −26.58 | f3 = 31.28 | f4 = −80.00 | f5 = −404.81 |

Example 9

| Unit mm | | | |
|---|---|---|---|
| Surface data | | | |
| Surface no. | r | d | nd | vd |
| Object plane | ∞ | ∞ | | |
| 1 | 736.850 | 4.50 | 1.64231 | 33.31 |
| 2 | −49.055 | 0.10 | | |
| 3 | 57.047 | 3.59 | 1.62409 | 40.42 |
| 4 | −413.948 | 1.30 | | |
| 5 | −52.542 | 1.60 | 1.85354 | 25.99 |
| 6 | 730.454 | 0.10 | | |
| 7 | 24.765 | 4.06 | 1.49199 | 69.72 |
| 8 | 112.273 | Variable | | |
| 9 | 115.684 | 1.20 | 1.71077 | 55.33 |
| 10 | 14.935 | 3.02 | | |
| 11 | −83.024 | 1.20 | 1.63934 | 41.67 |
| 12 | 14.728 | 3.07 | 1.86420 | 40.46 |
| 13 | −114.864 | Variable | | |
| 14 (stop) | ∞ | Variable | | |
| 15 | 66.550 | 2.96 | 1.55027 | 63.99 |
| 16 | −56.974 | 0.10 | | |
| 17 | 34.901 | 4.00 | 1.70049 | 55.71 |
| 18 | −19.476 | 1.20 | 1.84666 | 23.78 |
| 19 | −63.227 | Variable | | |
| 20 | 60.865 | 1.20 | 1.88300 | 40.77 |
| 21 | 12.486 | Variable | | |
| 22 | −25.000 | 1.20 | 1.48904 | 70.07 |
| 23 | 40.000 | 4.50 | 1.85998 | 28.20 |
| 24 | −27.362 | 13.13 | | |
| Image plane (Image pickup surface) | ∞ | | | |

| Various data | |
|---|---|
| Image height | 11.15 |
| Lens total length | 96.557 |
| fb | 13.129 |

| | First infinite distance | First close distance |
|---|---|---|
| Magnification | 0 | −0.60 |
| Focal length | 84.20 | 61.02 |
| Fno. | 3.50 | 3.65 |
| Angle of view 2ω | 15.31 | 13.09 |
| d8 | 6.03 | 6.03 |
| d13 | 7.62 | 7.62 |
| d14 | 5.05 | 5.05 |
| d19 | 0.93 | 10.80 |
| d21 | 24.89 | 15.02 |

-continued

| Unit mm | | |
|---|---|---|
| | Second infinite distance | Second close distance |
| Magnification | 0 | 1.0 |
| Focal length | 70.27 | 61.82 |
| Fno. | 3.30 | 5.80 |
| Angle of view 2ω | 17.35 | 8.63 |
| d8 | 2.81 | 12.65 |
| d13 | 10.84 | 1.00 |
| d14 | 11.46 | 1.00 |
| d19 | 3.31 | 13.76 |
| d21 | 16.10 | 16.10 |

Unit focal length f1 = 40.52   f2 = −43.28   f3 = 23.54   f4 = −18.00   f5 = 44.34

FIGS. 10A to 10H through 27I to 27P are aberration diagrams of the taking lens systems according to the first to ninth examples. In the aberration diagrams, "FIY" represents the largest image height.

Among the aberration diagrams, FIGS. 10A to 10D, 12A to 12D, 14A to 14D, 16A to 16D, 18A to 18D, 20A to 20D, 22A to 22D, 24A to 24D, and 26A to 26D respectively show spherical aberration (SA), astigmatism (AS), distortion (DT), and chromatic aberration of magnification (CC) in the state in which the lens system is focused on an object at infinity in the first shooting mode.

Among the aberration diagrams, FIGS. 10E to 10H, 12E to 12H, 14E to 14H, 16E to 16H, 18E to 18H, 20E to 20H, 22E to 22H, 24E to 24H, and 26E to 26H respectively show spherical aberration (SA), astigmatism (AS), distortion (DT), and chromatic aberration of magnification (CC) in the state in which the lens system is focused on an object at a close distance in the first shooting mode.

Among the aberration diagrams, FIGS. 11A to 11D, 13A to 13D, 15A to 15D, 17A to 17D, 19A to 19D, 21A to 21D, 23A to 23D, 25A to 25D, and 27A to 27D respectively show spherical aberration (SA), astigmatism (AS), distortion (DT), and chromatic aberration of magnification (CC) in the state in which the lens system is focused on an object at infinity in the second shooting mode.

Among the aberration diagrams, FIGS. 11E to 11H, 13E to 13H, 15E to 15H, 17E to 17H, 19E to 19H, 21E to 21H, 23E to 23H, 25E to 25H, and 27E to 27H respectively show spherical aberration (SA), astigmatism (AS), distortion (DT), and chromatic aberration of magnification (CC) in the state in which the lens system is focused on an object at a close distance in the second shooting mode.

Next, the values of conditional expressions (1) to (6) in each example are shown below.

| Conditional expressions | Example 1 | Example 2 | Example 3 |
|---|---|---|---|
| (1) $f_n/f_{infl}$ | −0.427 | −0.333 | −0.608 |
| (2) $M_{p12}/f_{inf2}$ | 0.062 | 0.101 | 0.182 |
| (3) $M_{p12}/M_{n12}$ | 0.514 | 0.725 | 0.792 |
| (4) $\beta_{inf2MAX}$ | 1 | 1 | 1 |
| (5) $M_{n12}/f_{inf2}$ | 0.121 | 0.14 | 0.229 |
| (6) $M_{ninf1MAX}/f_{inf1}$ | 0.12 | 0.179 | 0.298 |

| Conditional expressions | Example 4 | Example 5 | Example 6 |
|---|---|---|---|
| (1) $f_n/f_{infl}$ | −0.651 | −0.347 | −0.669 |
| (2) $M_{p12}/f_{inf2}$ | 0.418 | 0.014 | 0.106 |
| (3) $M_{p12}/M_{n12}$ | 0.737 | 0.595 | 2.366 |
| (4) $\beta_{inf2MAX}$ | 1 | 1 | 1 |
| (5) $M_{n12}/f_{inf2}$ | 0.567 | 0.024 | 0.045 |
| (6) $M_{ninf1MAX}/f_{inf1}$ | 0.305 | 0.158 | 0.336 |

| Conditional expressions | Example 7 | Example 8 | Example 9 |
|---|---|---|---|
| (1) $f_n/f_{infl}$ | −1.004 | −1.158 | −0.214 |
| (2) $M_{p12}/f_{inf2}$ | 0.184 | 0.026 | 0.091 |
| (3) $M_{p12}/M_{n12}$ | 1.12 | 0.161 | 0.729 |
| (4) $\beta_{inf2MAX}$ | 1 | 1 | 1 |
| (5) $M_{n12}/f_{inf2}$ | 0.164 | 0.163 | 0.125 |
| (6) $M_{ninf1MAX}/f_{inf1}$ | 0.451 | 0.225 | 0.117 |

Figure 28:
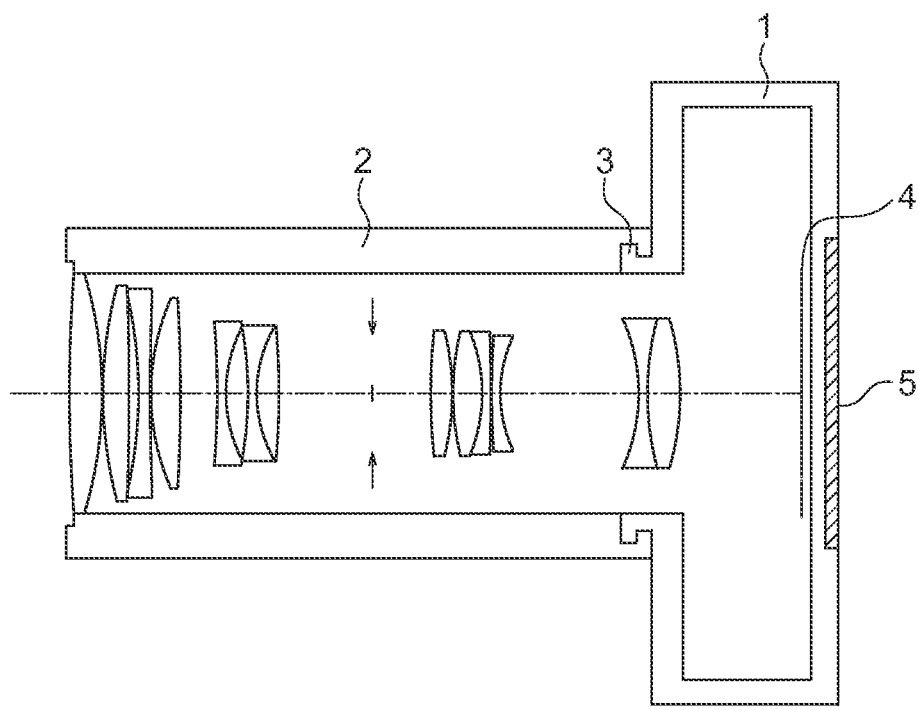
FIG. 28 is a cross sectional view of an interchangeable lens camera that uses as a taking lens system according to the present invention as an interchangeable lens.

FIG. 28 is a cross sectional view of a single lens mirror-less camera as an electronic image pickup apparatus. FIG. 28 shows the single lens mirror-less camera 1, a taking lens system 2 provided in a lens barrel, a mount portion 3 of the lens barrel with which the taking lens system 2 can be detachably mounted on the single lens mirror-less camera 1. The mount portion 3 may be a screw mount, a bayonet mount or the like. In this illustrative case, a bayonet mount is used. FIG. 28 also shows a surface 4 of an image pickup element and a monitor 5 on the back of the camera. The image pickup element may be a small-size CCD or CMOS sensor.

As the taking lens system 2 of the single lens mirror-less camera 1, a taking lens system according to the present invention, for example, according to one of the first to eighth examples is used.

Figure 29:
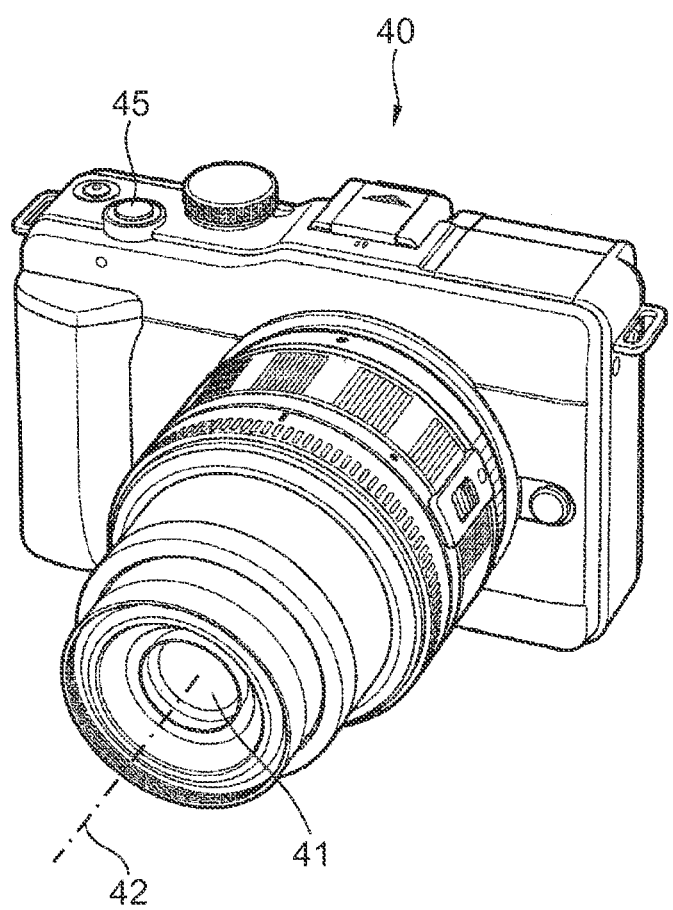
FIG. 29 is a front perspective view showing the outer appearance of a digital camera according to the present invention.
Figure 30:
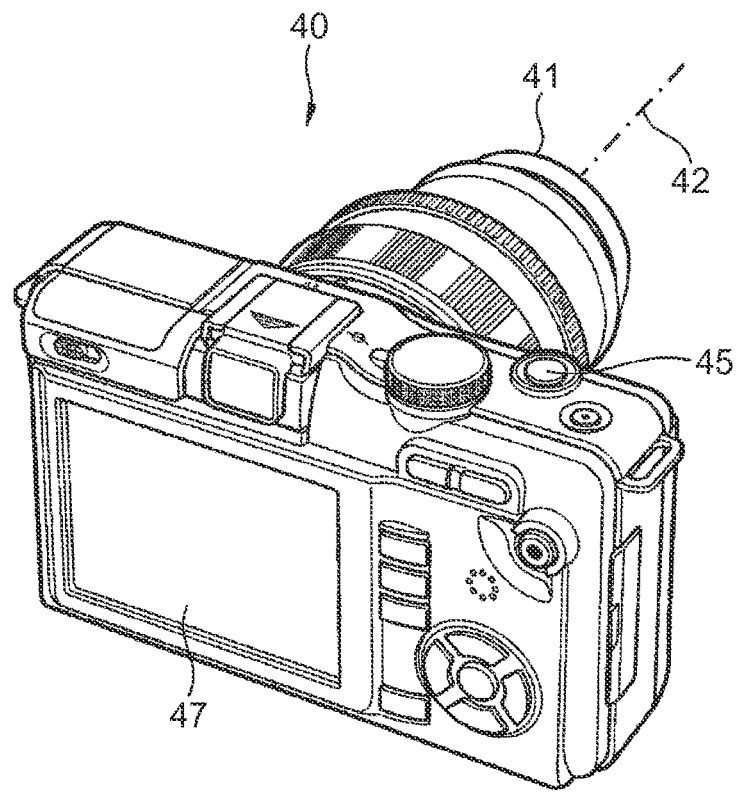
FIG. 30 is a rear perspective view of the digital camera shown in FIG. 29.

FIGS. 29 and 30 schematically show the construction of an image pickup apparatus according to the present invention. FIG. 29 is a front perspective view showing the outer appearance of a digital camera 40 as the image pickup apparatus. FIG. 30 is a rear perspective view of the digital camera 40. In this digital camera 40, a taking lens system according to the present invention is used as the taking optical system 41.

The digital camera 40 according to this example has the taking optical system 41 arranged in the taking optical path 42, a shutter release button 45, and a liquid crystal display monitor 47. In response to depression of the shutter release button 45 provided on the top of the camera 40, shooting through the taking optical system 41, e.g. the taking lens system according to the first example, is effected. Specifically, an image of an object is formed by the taking optical system 41 on the image pickup element (photoelectric conversion surface) provided in the vicinity of the image plane. The image of the object picked up by the image pickup element is processed by a processing unit and displayed as an electronic image on the liquid crystal display monitor 47 provided on the back of the camera. The picked-up electronic image can be stored in a storage unit.

Figure 31:
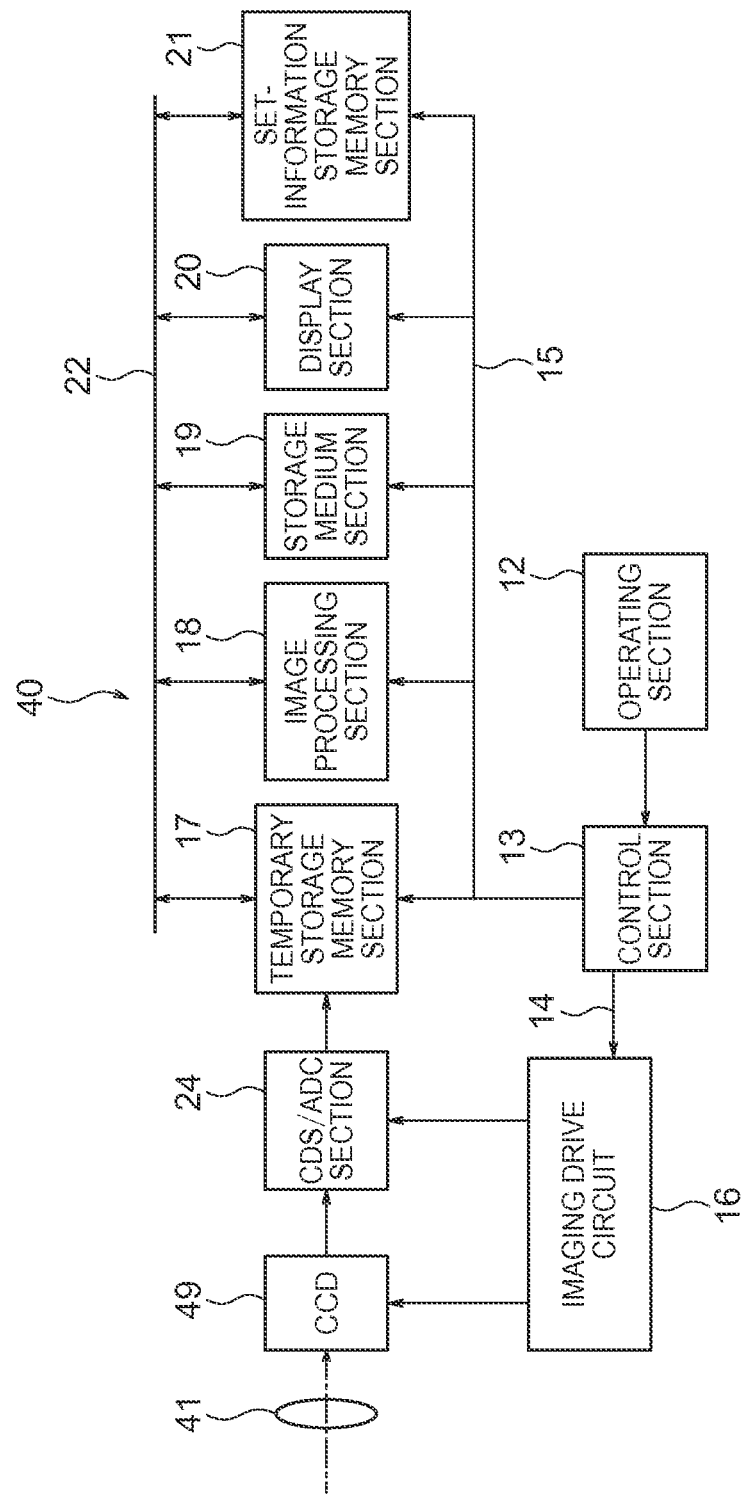
FIG. 31 is a block diagram showing the relevant internal circuit of the digital camera shown in FIG. 29.

FIG. 31 is a block diagram showing the relevant internal circuit of the digital camera 40. In the case described hereinafter, the processing unit described above includes for instance, a CDS/ADC section 24, a temporary storage memory section 17, and an image processing section 18, and the storage unit includes a storage medium section 19 for example.

As shown in FIG. 31, the digital camera 40 has an operating section 12 and a control section 13 connected to the operating section 12. The digital camera 40 also has an imaging drive circuit 16, the temporary storage memory section 17, the image processing section 18, the storage medium section 19, a display section 20, and a set-information storage memory section 21, which are connected to control signal output ports of the control section 13 via buses 14 and 15.

The temporary storage memory section 17, the image processing section 18, the storage medium section 19, the display section 20, and the set-information storage memory section 21 are configured to be capable of mutually inputting and outputting data via a bus 22. Moreover, the CCD 49 and the CDS/ADC section 24 are connected to the imaging drive circuit 16.

The operating section 12 is equipped with various entry buttons and switches and notifies the control section 13 of event information entered through the entry buttons and switches from outside (by a user of the camera). The control section 13 is a central processing device such as a CPU and has a built-in program memory, which is not shown in the drawings. The control section 13 performs overall control of the digital camera 40 according to a program stored in the program memory.

The CCD 49 is an image pickup element that is driven and controlled by the imaging drive circuit 16 to convert the quantity of light of the object image formed through the taking optical system 41 into an electrical signal on a pixel-by-pixel basis and to output it to the CDS/ADC section 24.

The CDS/ADC section 24 is a circuit that amplifies the electrical signals input from the CCD 49, performs analog-to-digital conversion, and outputs to the temporary storage memory section 17 raw image data (or Bayer data, which will be hereinafter referred to as "RAW data") that has undergone only amplification and digital conversion.

The temporary storage memory section 17 may include, for example, an SDRAM and serves as a buffer. The temporary storage memory section 17 is a memory device that temporarily stores the RAW data output from the CDS/ADC section 24. The image processing section 18 is a circuit that reads RAW data stored in the temporary storage memory section 17 or RAW data stored in the storage medium section 19 and performs various electrical image processing including distortion correction based on image quality parameters specified by the control section 13.

The storage medium section 19 allows a detachable mounting of a recording medium such as, for example, a card-type or stick-type flash memory. The storage medium section 19 records or writes RAW data transferred from the temporary storage memory section 17 and image data having been processed in the image processing section 18 in the flash memory to have the data stored in it.

The display section 20 includes the liquid-crystal display monitor 47 and displays picked-up RAW data, image data, and operation menu etc. The set-information storage memory section 21 includes a ROM section in which various image quality parameters are stored in advance and a RAM section for storing image quality parameters read from the ROM section in response to an entry(ies) made through the operating section 12.

The digital camera 40 having the above-described construction uses as the taking optical system 41 a taking lens system according to the present invention. Thus, the digital camera 40 can be an image pickup apparatus that is advantageous in producing high resolution images without deterioration in image quality, while having a wide angle of view and being small in size.

As described above, the taking lens system and the image pickup apparatus according to the present invention are useful when images accompanied by recorded sound with low noise and/or high resolution images of high image magnification are desired to be obtained.

What is claimed is:
1. A taking lens system comprising:
a frontmost lens unit that is arranged closest to the object side;
a rearmost lens unit that is arranged closest to the image side; and
a plurality of lens units that are arranged between the frontmost lens unit and the rearmost lens unit, wherein
one of the plurality of lens units is a first focusing lens unit;
in a first shooting mode, only the first focusing lens unit moves toward the image side during focusing from an infinite object distance to a close object distance;
in a second shooting mode, at least two lens units in the taking lens system move during focusing from an infinite object distance to a close object distance;
in the state in which the taking lens system is focused on an object at infinity, the positions of the first focusing lens unit and at least one lens unit in the taking lens system in the first shooting mode are different from those in the second shooting mode, and
$M_{n1} > M_{n2}$ is satisfied,
where $M_{n1}$ is the distance between the first focusing lens unit and the image plane in the first shooting mode, and
$M_{n2}$ is the distance between the first focusing lens unit and the image plane in the second shooting mode, both in the state in which the taking lens system is focused on an object at infinity.

2. The taking lens system according to claim 1, wherein the first focusing lens unit has a negative refractive power, and
the lens units arranged on the object side of the first focusing lens unit as a whole have a positive refractive power.

3. The taking lens system according to claim 1, wherein the frontmost lens unit and the rearmost lens unit are stationary during focusing from an infinite object distance to a close object distance in the second shooting mode.

4. The taking lens system according to claim 1, wherein one lens unit among the at least two lens units has a negative refractive power, another lens unit among the at least two lens units has a positive refractive power, and
the at least two lens units that move during focusing from an infinite object distance to a close object distance in the second shooting mode do not include the first focusing lens unit.

5. The taking lens system according to claim 1, wherein one lens unit among the at least two lens units that move during focusing from an infinite object distance to a close object distance in the second shooting mode is the first focusing lens unit.

6. The taking lens system according to claim 1, wherein the first focusing lens unit has a negative refractive power and consists of two or less lenses, and
the following conditional expression (1) is satisfied:

$$-1.2 \le f_n/f_{inf1} \le -0.2 \tag{1},$$

where $f_n$ is the focal length of the first focusing lens unit, and $f_{inf1}$ is the focal length of the entire taking lens system in the first shooting mode in the state in which the taking lens system is focused on an object at infinity.

7. The taking lens system according to claim 6, wherein the first focusing lens unit consists of one lens.

8. The taking lens system according to claim 1, wherein the first focusing lens unit has a negative refractive power,
the taking lens system includes a lens unit having a positive refractive power arranged immediately in front and on the object side of the first focusing lens unit,
the plurality of lens units include the lens unit having a positive refractive power,
the at least one lens unit includes the lens unit having a positive refractive power, and the following conditional expressions (2) and (3) are satisfied:

$$0 < M_{p12}/f_{inf2} \leq 0.45 \quad (2) \text{ and}$$

$$0.1 \leq M_{p12}/M_{n12} \leq 3.0 \quad (3),$$

where $M_{p12}=M_{p1}-M_{p2}$, $M_{n12}=M_{n1}-M_{n2}$, $M_{p1}$ is the distance between the lens unit having a positive refractive power and the image plane in the first shooting mode, $M_{p2}$ is the distance between the lens unit having a positive refractive power and the image plane in the second shooting mode, $M_{n1}$ is the distance between the first focusing lens unit and the image plane in the first shooting mode, $M_{n2}$ is the distance between the first focusing lens unit and the image plane in the second shooting mode, and $f_{inf2}$ is the focal length of the entire taking lens system in the second shooting mode, where all the distances and focal lengths are those in the state in which the taking lens system is focused on an object at infinity.

9. The taking lens system according to claim 1, wherein the frontmost lens unit and the rearmost lens unit are stationary during focusing from an infinite object distance to a close object distance both in the first shooting mode and in the second shooting mode.

10. The taking lens system according to claim 1, wherein the taking lens system includes a second focusing lens unit and a third focusing lens unit provided between the frontmost lens unit and the first focusing lens unit, the plurality of lens units include the second focusing lens unit and the third focusing lens unit, and during focusing from an infinite object distance to a close object distance in the second shooting mode, the second focusing lens unit and the third focusing lens unit move.

11. The taking lens system according to claim 10, wherein the second focusing lens unit has a negative refractive power, the third focusing lens unit has a positive refractive power, the third focusing lens unit is located between the second focusing lens unit and the first focusing lens unit, and during focusing from an infinite object distance to a close object distance in the second shooting mode, the second focusing lens unit moves toward the image side and the third lens unit moves toward the object side.

12. The taking lens system according to claim 11, wherein the third focusing lens unit is arranged immediately in front and on the object side of the first focusing lens unit, and the third lens unit is located closer to the object side in the first shooting mode than in the first shooting mode.

13. The taking lens system according to claim 11, wherein the frontmost lens unit has a positive refractive power.

14. The taking lens system according to claim 1, wherein the first focusing lens unit moves back and forth along the direction of the optical axis by a predetermined movement amount, and the predetermined movement amount is smaller than the amount of movement during focusing from an infinite object distance to a close object distance in the first shooting mode.

15. The taking lens system according to claim 1, wherein the following conditional expression (4) is satisfied:

$$0.3 \leq \beta_{inf2MAX} \leq 1.5 \quad (4),$$

where $\beta_{inf2MAX}$ is the absolute value of the highest image magnification of the taking lens system in the second shooting mode.

16. The taking lens system according to claim 1, wherein the following conditional expressions (5) and (6) are satisfied:

$$0.01 \leq M_{n12}/f_{inf2} \leq 0.60 \quad (5),$$

$$0.1 \leq M_{ninfMAX}/f_{inf1} \leq 0.5 \quad (6),$$

where $M_{n12}=M_{n1}-M_{n2}$, $M_{ninf1MAX}=M_{n3}-M_{n4}$, $M_{n1}$ is the distance between the first focusing lens unit and the image plane in the first shooting mode in the state in which the taking lens system is focused on an object at infinity, $M_{n2}$ is the distance between the first focusing lens unit and the image plane in the second shooting mode in the state in which the taking lens system is focused on an object at infinity, $M_{n3}$ is the distance between the first focusing lens unit and the image plane in the state in which the first focusing lens unit is located farthest from the image plane in the first shooting mode, $M_{n4}$ is the distance between the first focusing lens unit and the image plane in the state in which the first focusing lens unit is located closest to the image plane in the first shooting mode, $f_{inf1}$ is the focal length of the entire taking lens system in the first shooting mode in the state in which the taking lens system is focused on an object at infinity, and $f_{inf2}$ is the focal length of the entire taking lens system in the second shooting mode in the state in which the taking lens system is focused on an object at infinity.

17. An image pickup apparatus comprising:

a taking lens system according to claim 1; and an image pickup element that is disposed on the image side of the taking lens system and converts an image formed by the taking lens system into an electrical signal.

* * * * *